(12) United States Patent
Hoekstra et al.

(10) Patent No.: US 10,461,857 B2
(45) Date of Patent: Oct. 29, 2019

(54) CLOCK RECOVERY FOR A CODED LIGHT RECEIVER

(71) Applicant: SIGNIFY HOLDING B.V., Eindhoven (NL)

(72) Inventors: Peter Hoekstra, Eindhoven (NL); Benjamin Johannes Vos, Eindhoven (NL); Constant Paul Marie Jozef Baggen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 16 days.

(21) Appl. No.: 15/579,861

(22) PCT Filed: Jun. 10, 2016

(86) PCT No.: PCT/EP2016/063258
§ 371 (c)(1),
(2) Date: Dec. 5, 2017

(87) PCT Pub. No.: WO2016/202691
PCT Pub. Date: Dec. 22, 2016

(65) Prior Publication Data
US 2018/0359030 A1    Dec. 13, 2018

(30) Foreign Application Priority Data

Jun. 16, 2015 (EP) .................................. 15172396

(51) Int. Cl.
*H04B 10/116* (2013.01)
*H04B 10/69* (2013.01)
(Continued)

(52) U.S. Cl.
CPC ......... *H04B 10/116* (2013.01); *H04B 10/691* (2013.01); *H04B 10/6971* (2013.01);
(Continued)

(58) Field of Classification Search
CPC . H04B 10/116; H04B 10/691; H04B 10/6971
See application file for complete search history.

(56) References Cited

U.S. PATENT DOCUMENTS

| 7,176,928 B1 | 2/2007 | Sendrovitz |
| 8,964,789 B1 | 2/2015 | Lee et al. |

(Continued)

FOREIGN PATENT DOCUMENTS

| WO | 2012052935 A1 | 4/2012 |
| WO | 2013064835 A2 | 5/2013 |
| WO | 2014170419 A1 | 10/2014 |

*Primary Examiner* — Dzung D Tran
(74) *Attorney, Agent, or Firm* — Daniel J. Piotrowski

(57) ABSTRACT

An apparatus, method and program for receiving a coded light signal comprising a periodically repeating message repeating with a message period. A portion of the message is received in each of a plurality of frames captured by a rolling-shutter camera, with different portions being received in different frames. Using each of a discrete group of trial values of the message period, the respective trial value is used to reconstruct a respective first version of the message from the portions received in a first subset of said frames, and to reconstruct a respective second version of the message from the portions received in a second subset of said frames. For each of the trial values, there is generate a respective value of a measure of similarity between the respective reconstructed first and second versions of the message. An estimate of the message period is determined based on this.

15 Claims, 16 Drawing Sheets

(51) Int. Cl.
*H04L 7/00* (2006.01)
*H04N 5/235* (2006.01)
*H05B 37/02* (2006.01)

(52) U.S. Cl.
CPC ......... *H04L 7/0012* (2013.01); *H04N 5/2353* (2013.01); *H05B 37/0272* (2013.01)

(56) References Cited

U.S. PATENT DOCUMENTS

| | | | |
|---|---|---|---|
| 8,988,509 B1* | 3/2015 | Macmillan | H04N 17/002 348/47 |
| 2004/0057499 A1 | 3/2004 | Haartsen | |
| 2008/0095291 A1 | 4/2008 | Cafaro et al. | |
| 2008/0112525 A1 | 5/2008 | Do et al. | |
| 2015/0271483 A1* | 9/2015 | Sun | H04N 17/002 348/187 |
| 2016/0182790 A1* | 6/2016 | Horesh | H04N 5/2256 348/371 |
| 2016/0219208 A1* | 7/2016 | Horesh | H04N 5/23219 |

* cited by examiner

Plastering of messages with consecutive footprints

Plastering of messages with consecutive footprints

CLOCK RECOVERY FOR A CODED LIGHT RECEIVER

CROSS-REFERENCE TO PRIOR APPLICATIONS

This application is the U.S. National Phase application under 35 U.S.C. § 371 of International Application No. PCT/EP2016/063258, filed on Jun. 10, 2016 which claims the benefit of European Patent Application No. 15172396.2, filed on Jun. 16, 2015. These applications are hereby incorporated by reference herein.

TECHNICAL FIELD

The present disclosure relates to the communication of coded light signals embedded in the light emitted by a light source.

BACKGROUND

Coded light refers to a technique whereby data is modulated into the visible illumination emitted by a light source, e.g. by an LED based luminaire. Thus in addition to providing illumination (for which purpose a light source may already be present in an environment), the light source also acts as a transmitter capable of transmitting data to a suitable receiver of coded light. The modulation is typically performed at a high enough frequency that it is imperceptible to human vision, i.e. so the user only perceives the overall illumination and not the effect of the data being modulated into that illumination. In this way the data may be said to be embedded into the light from the light source.

Coded light can be used in a number of applications. For instance, one application is to provide information from a luminaire to a remote control unit for controlling that luminaire, e.g. to provide an identifier distinguishing it amongst other such luminaires which the remote unit can control, or to provide status information on the luminaire (e.g. to report errors, warnings, temperature, operating time, etc.). In one such example, the remote control unit may comprise a mobile user terminal such as a smart phone or tablet having an inbuilt camera. With the terminal running a suitable application, the user can direct the camera at a luminaire and thereby detect the identifier coded into the light from that luminaire. Given the identifier of the luminaire it is looking at, the terminal may then control that luminaire by sending back a return signal (e.g. via RF).

In another application the coded light may be used to provide information to a user, e.g. to provide identifiers of the luminaires for use in commissioning, or to enable provision of location related information. For example each luminaire in an indoor and/or outdoor environment (e.g. in the rooms and corridors of an office complex, and/or paths of a campus) may be arranged to emit light embedded with a respective identifier identifying it within that environment. If a user has a mobile terminal equipped with a camera, and an associated application for detecting coded light, the terminal can detect the identifier of a luminaire illuminating its current location. This can then be used to help the user navigate the environment, by looking up the current location in location database mapping the identifiers to locations of the luminaires. Alternatively or additionally, this may be used to look up information associated with the user's current location, such as information on exhibits in particular rooms of a museum. E.g. the look up may be performed via the Internet or a local network to which the terminal has access, or from a local database on the user terminal. Alternatively the information could be directly coded into the light from one or more luminaires. Generally speaking, the applicability of coded light is not limited.

Data is modulated into the light by means of a technique such as amplitude keying or frequency shift keying, whereby the modulated property (e.g. amplitude or frequency) is used to represent channel symbols. The modulation typically involves a coding scheme to map data bits (sometimes referred to as user bits) onto such channel symbols. An example is a conventional Manchester code, which is a binary code whereby a user bit of value 0 is mapped onto a channel symbol in the form of a low-high pulse and a user bit of value 1 is mapped onto a channel symbol in the form of a high-low pulse. Another example is the recently developed Ternary Manchester code, described in international patent application publication no. WO2012/052935.

There is a growing interest in using coded light in applications where the light from a light source is to be captured using a rolling shutter camera, such as the cheap cameras often found in mobile phone devices. A rolling shutter camera scans the lines of the image one at a time, line-by-line (typically at a minimum of $18k$ lines/s). As the lines are recorded time-sequentially, and the codes in the light may also vary time-sequentially, additional processing is involved. Typically the samples on a line are "integrated" or "condensed" into a single value per line. Each line thus captures a sample of the signal at a different moment in time, enabling the coded light signal to be reconstructed.

Some digital data streams, especially high-speed serial data streams are sent without an accompanying clock signal. The receiver generates a clock from an approximate frequency reference, and then phase-aligns to the transitions in the data stream with a phase locked loop (PLL). This process is commonly known as clock and data recovery (CDR).

A coded light receiver based on a rolling-shutter camera may not receive data in a continuous stream. Rather, it may receive a message in short, interrupted portions, with each portion being received in a respective frame. E.g. this may occur because the light source only covers a small number of lines within the frame area, and therefore each frame only captures a small part of the message. The frame rate and line rate of the camera are not typically synchronized with the transmission of the message, and therefore in general the portion received in one frame does not necessarily follow immediately on from the point in the message at which previous portion ended. This means that to reconstruct the message, these portions have to be time-aligned to the right position in the message by means of a reassembly process, also called "stitching". Because the samples are not received in a continuous stream, a standard PLL (phase-locked loop) solution cannot be used to recover the clock.

SUMMARY

The following discloses a technique to estimate the message period of a coded light message while reconstructing the message at the same time.

In order to reconstruct a coded light message, the message portions measured by the rolling-shutter camera have to be stitched at the right (time) positions in the message. To determine the right position, the frame rate, the line rate (readout time) and the message period have to be accurately known. The frame rate and line rate are known parameters of the receiver. However, the message period is determined by the clock of the driver of the transmitting light source.

Certain types of drivers have inaccurate clocks which also vary over time, which may have an impact on the accuracy with which coded light messages can be reconstructed at the receive side. E.g. for a symbol frequency of 2 kHz and a message length of about 30 symbols, preferably the frequency should be known with an accuracy of better than 0.1 Hz.

The following is based on the observation that if the message is periodic, then two messages which are reconstructed at different times should be the same. By exploiting the fact that the messages are repetitive, this allows the receiver to try several different values of message period in a range of expected values, and to calculate a measure of similarity (e.g. correlation) between discrete combinations of the different reconstructed messages (e.g. for discrete pairs of messages). Based on the resulting correlations, or such like, the proper message period can then be determined more precisely.

According to one aspect disclosed herein, there is provided a signal processing module for receiving a coded light signal from light captured by a rolling-shutter camera, wherein the coded light signal comprises a periodically repeating message repeating with a message period. The signal processing module is configured to receive the coded light signal by performing operations as follows. A respective portion of the message is received in each of a plurality of frames captured by the rolling-shutter camera, with different ones of said portions being received in different ones of the frames (and preferably all of the portions being received over multiple of the frames, though potentially the message could be partially recovered with some missing portions, and perhaps corrected using an error correction algorithm if it contains redundant information). Based on each respective one of a discrete group of trial values of the message period, the respective trial value is used to reconstruct a respective first version of the message from the portions received in a first subset of said frames, and to reconstruct a respective second version of the message from the portions received in a second subset of said frames, wherein one or more of the frames in the second subset are not members of the first subset (i.e. first and second subsets at least not entirely coincident, and may or may not overlap). For each of the trial values, there is generated a respective value of a measure of similarity between (at least) the respective reconstructed first and second versions of the message (e.g. a measure of correlation). An estimate of the message period is then determined based on the values of said measure of similarity, and an output version of the message is determined based on said estimate.

In embodiments, said determination of the estimated message period may be performed by: fitting a curve to the values of said measure of similarity generated for each of the trial values of the message period, determining a maximum of the curve, and determining said estimate as a value of the message period corresponding to a maximum of said curve. E.g. the fitted curve may be a parabolic curve.

Alternatively the determination of the estimated message period may be performed by: selecting, as said estimate, one of the trial values of the message period for which the respective value of said measure of similarity is highest from amongst those generated.

In embodiments, said measure of similarly may be a dot product of the respective reconstructed first and second versions of the message.

In embodiments, the second subset of frames may comprise one or more frames that are not members of the first subset but also one or more frames that are members of the first subset (i.e. the second subsets overlaps with the first, such that some of the second subset are the same as some of the first, but others are different). Alternatively, the second subset of frames may contain no members of the first subset (i.e. they are entirely exclusive, containing none of the same frames).

In embodiments, the output version of the message is determined by: using the estimate of the message period to newly reconstruct the output version of the message from the portions received in the first subset of frames, or in the second subset of frames, or in a further subset of said frames (wherein one or more of the frames in the further subset are not members the first and second subsets). E.g. if the estimated message period is extrapolated between two of the trial values based on a fitted curve, this new estimate (that was not exactly one of the trial values) may be used to re-generate a new reconstruction of the message (slightly better than any of the versions generated based on the trial values).

Alternatively however, the output version of the message may be determined by: selecting, as the output version, one of the already-reconstructed first or second versions of the message, from amongst the first and second versions reconstructed for each of the trial values, for which the respective value of said measure of similarity is highest from amongst those generated. I.e. the selected output version may be the one of the existing reconstructed messages that gives the best approximation.

In embodiments, a light source emitting the coded light signal may appear in only a subarea of each of the frames, the signal processing module being configured to detect said subarea and to extract the respective portion of the message from the subarea in each frame.

According to another aspect disclosed herein, there may be provided a device comprising the signal processing module and the rolling-shutter camera, wherein the signal-processing module is coupled to the rolling-shutter-camera so as to receive the captured frames. E.g. the device may be a user terminal such as a smartphone or tablet.

According to another aspect disclosed herein, there may be provided a system comprising said device and a light source emitting light comprising said coded light signal, wherein the rolling-shutter camera is arranged to capture the light in said frames. E.g. the light source may be a luminaire and the light may take the form of illumination for illuminating an environment.

According to another aspect disclosed herein, there may be provided a computer program product for receiving a coded light signal from light captured by a rolling-shutter camera, wherein the coded light signal comprises a periodically repeating message repeating with a message period; and wherein the computer program product comprises code embodied on a computer-readable storage medium and being configured so as when run on a signal processing module to perform operations of: receiving a respective portion of the message in each of a plurality of frames captured by the rolling-shutter camera, with different ones of said portions being received in different ones of the frames; based on each respective one of a discrete group of trial values of the message period, using the respective trial value to reconstruct a respective first version of the message from the portions received in a first subset of said frames, and to reconstruct a respective second version of the message from the portions received in a second subset of said frames, wherein one or more of the frames in the second subset are not members of the first subset; for each of the trial values, generating a respective value of a measure of similarity between the respective reconstructed first and second versions of the message; and determining an estimate of the message period based on the values of said measure of similarity, and determining an output version of the message based on said estimate.

According to another aspect disclosed herein, there may be provided a method of receiving a coded light signal from light captured by a rolling-shutter camera, wherein the coded light signal comprises a periodically repeating message repeating with a message period; and wherein the method comprises: receiving a respective portion of the message in each of a plurality of frames captured by the rolling-shutter camera, with different ones of said portions being received in different ones of the frames; based on each respective one of a discrete group of trial values of the message period, using the respective trial value to reconstruct a respective first version of the message from the portions received in a first subset of said frames, and to reconstruct a respective second version of the message from the portions received in a second subset of said frames, wherein one or more of the frames in the second subset are not members of the first subset; for each of the trial values, generating a respective value of a measure of similarity between the respective reconstructed first and second versions of the message; and determining an estimate of the message period based on the values of said measure of similarity, and determining an output version of the message based on said estimate.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The decoding techniques disclosed below are aimed at providing a practical solution for coded light, enabling coded light to be received using existing rolling-shutter cameras such as the cheap cameras typically found in smartphones and tablets.

Cheap rolling-shutter cameras effectively scan their images, so as the lines progress, so does time. This implies that the timestamp of the top line is much earlier than the timestamp of the bottom line. Now imagine that coded light is present in the image—the coded light will typically only be visible in a small section of the image.

The lines that actually image the light are the lines that contain coded light. Each line is "condensed" into a single value and that single value corresponds with a bit of information or a symbol; that is the bit or symbol transmitted at the moment in time that the line was scanned. Now for the rolling shutter camera to decode a message, one could make sure that the number of lines per frame is high enough (or the light big enough) and decode images based on a single frame. However, as will be discussed in more detail shortly, that is not always possible.

Figure 1:
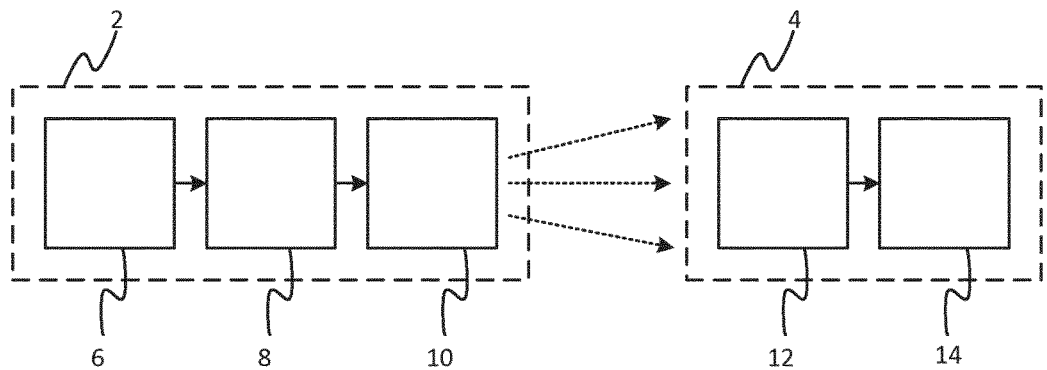
FIG. 1 is a schematic block diagram of a coded light communication system.

FIG. 1 gives a schematic overview of a system for transmitting and receiving coded light. The system comprises a transmitter 2 and a receiver 4. For example the transmitter 2 may take the form of a luminaire (e.g. mounted on the ceiling or wall of a room, a free-standing lamp, or an outdoor light pole); and the receiver 4 may take the form of a mobile user terminal such as a smart phone, tablet or laptop computer. The transmitter 2 comprises a light source 10 and a driver 8 connected to the light source 10. The transmitter 2 also comprises a device in the form of a controller 6 and an output to the driver 8, for controlling the light source 10 to be driven via the driver 8. For example the controller 6 may take the form of software stored on a memory of the transmitter 2 and arranged for execution on a processor of the transmitter, or alternatively it is not excluded that some or all of the controller 6 could be implemented in hardware, or configurable or reconfigurable hardware circuitry. The receiver 4 comprises a camera 12 and a device in the form of a signal processing module 14 and input from the camera 12. The signal processing module 14 may for example take the form of software stored on a memory of the receiver 4 and arranged for execution on a processor of the receiver 4, or alternatively it is not excluded that some or all of the signal processing module 14 could be implemented in dedicated hardware circuitry, or configurable or reconfigurable hardware circuitry. The controller 6 and signal processing module 14 are configured to perform transmit-side and receive side operations (respectively) in accordance with embodiments disclosed herein.

Figure 2:
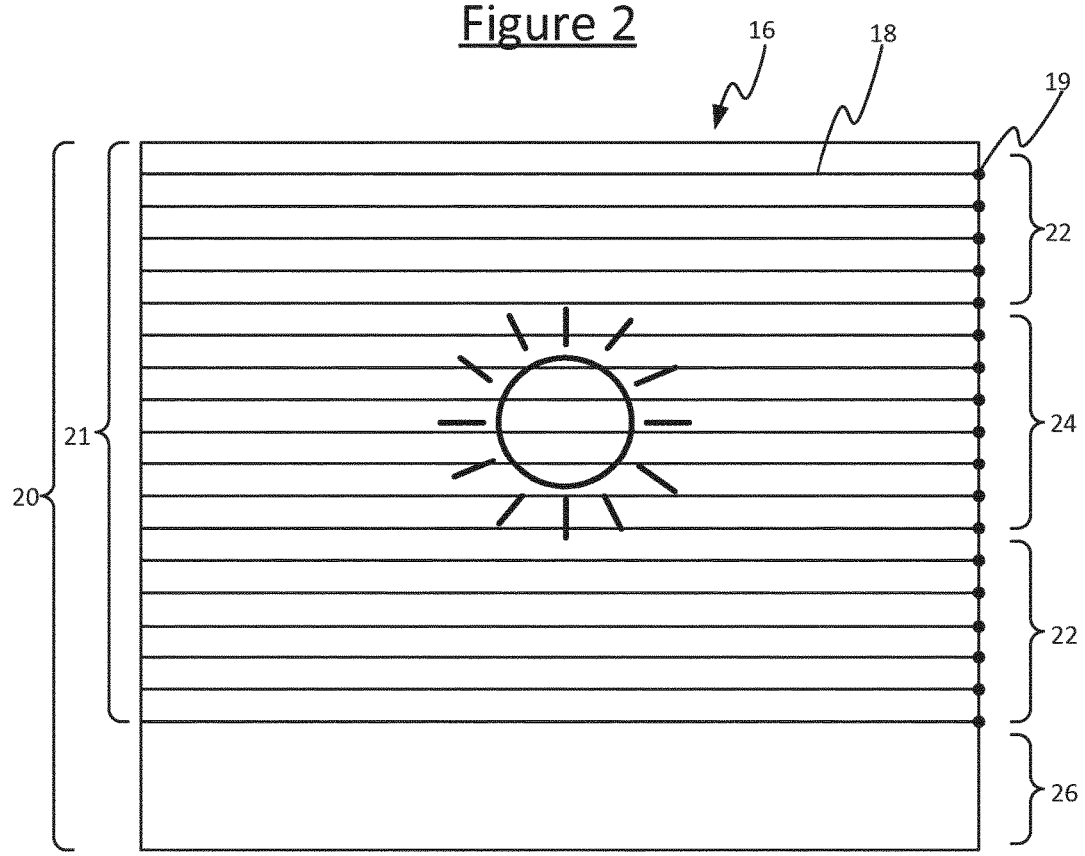
FIG. 2 is a schematic representation of a frame captured by a rolling shutter camera.
Figure 3:
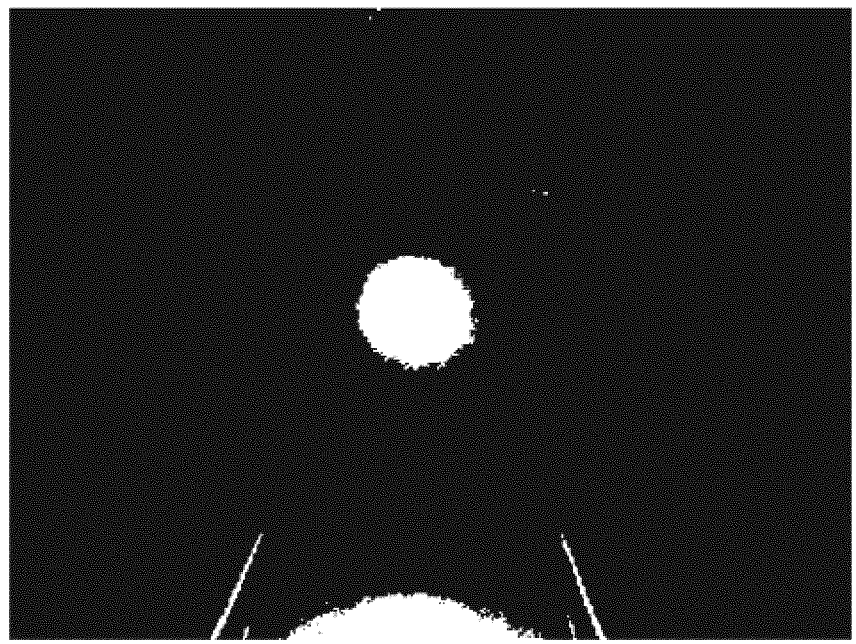
FIG. 3 shows an example of a captured frame.

Referring to FIGS. 2 and 3, the camera 12 is arranged to capture a series of frames 16, which if the camera is pointed towards the light source 10 will contain an image of light from the light source 10. The camera 12 is a rolling shutter camera, which means it captures each frame 16 not all at once (as in a global shutter camera), but by line-by-line in a sequence of lines 18. That is, each frame 16 is divided into a plurality of lines 18 (total number of lines labelled 20), typically horizontal lines, each spanning across the frame 16 and being one or more pixels thick (e.g. spanning the width of the frame 16 and being one or more pixels high in the case of horizontal lines). The capture process begins by exposing one line 18, then the next (typically an adjacent line), then the next, and so forth. For example the capturing process may roll top-to-bottom of the frame 16, starting by exposing the top line, then the next line from top, then the next line down, and so forth. Alternatively it could roll bottom-to-top (or even in vertical lines side to side). Note that the exposures of each line may be exclusive in time, or alternatively may overlap in time (but either way begin at different times). The camera 12 has a certain exposure time Texp, and each line is exposed in turn for an instance of this same exposure time. Note also that in the case of digital cameras, "exposure" does not mean in the sense of a mechanical shutter, but rather the time for which the pixels of the line are capturing or sampling the light.

To capture a sample for the purpose of detecting coded light, some or all of the individual pixels samples of each given line 18 are combined into a respective combined sample 19 for that line (e.g. only the "active" pixels that usefully contribute to the coded light signal, to be discussed later with reference to FIGS. 3 and 4). For instance the combination may be performed by integrating or averaging the pixel values, or by any other combination technique. Alternatively a certain pixel could be taken as representative of each line.

In the existing literature it is assumed that the source 10 covers all or almost all of every frame. However this is often not the case. Moreover the light being emitted is not necessarily synchronized with the capturing process which can result in further problems.

A particular problem in using a rolling shutter camera for coded light detection therefore arises, because the light source 10 serving as a coded light transmitter may in fact cover only a fraction of the lines 18 of each frame 16. Actually, only the lines 24 in FIG. 2 contain pixels that record the intensity variations of the coded light source and thus lead to samples containing useful information. See also FIG. 3. All the remaining "lines per frame" 22 and their derived samples do not contain coded light information related to the source 10 of interest. If the source 10 is small, one may only obtain a short temporal view of the coded light source 10 in each frame 16 and therefore the existing techniques only allow for very short messages. However, it may be desirable to have the possibility of also transmitting longer messages. Note also that there may be some lines 26 that are "hidden" or inactive, e.g. due to a selected frame format (leaving only active lines 21 contributing to the captured image).

Thus a rolling shutter may result in short, temporally-interrupted views of the coded light source. Note also, there may be other reasons why a message is not received in a single frame: e.g. even if the coded light fills the entire frame (e.g. by use of a diffuser), then the message may be longer than the frame (i.e. may last longer than the time taken to scan all the lines in the frame). If there is also a time gap between frames, the view of the message will again be interrupted in a misaligned fashion. The scope of the present disclosure is not limited in this respect, and may be used in any situation where a message is received in smaller, misaligned or unsynchronized portions over multiple frames, with a respective portion being received in each frame (a portion being part but not all of the message).

The following embodiments combine information from multiple video frames in a rolling shutter camera, such that messages longer than their footprint in a single video frame can be captured and decoded. In embodiments this involves: (i) use of a signal format whereby a message is cyclically repeated by the transmitter; and (ii) at the receiver, exploiting the knowledge of the repetition time of the message (Tm) and the knowledge of the frame duration (Tframe) for reconstructing a complete message from the partial snapshots obtained in each frame. To this end the disclosure provides a method to collect and reassemble the data collected from multiple frames. Particularly, the following provides a technique to estimate the message period (Tm) from the received coded light message while reconstructing the message, and thereby improve the robustness and/or accuracy of the process of reconstructing the message despite the fact that the transmit clock may be imperfectly known. The technique does not require the data stream to be continuous.

Particularly, as mentioned, a key element behind the disclosed technique is the following observation: as the message is periodic, two messages which are reconstructed at different times should be the same.

Based on this observation, the receive processing module 14 at the receiver 4 can be configured to reconstruct different instances of the same, repeated message from different subsets of frames; to compute a correlation between these instances; and to use the result of the correlation to determine an estimate of the true message period as generated based on the imperfect clock at the transmitter 2. This improved estimate can then be used to determine a final version of the message for output to the application in question (e.g. indoor location tracking, commissioning tool, etc.).

Figure 24:
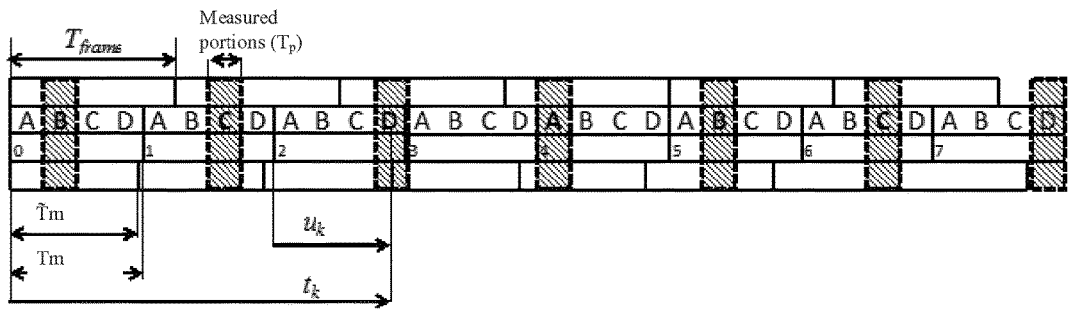

Referring to FIG. 24 by way of example, consider a message M consisting of four portions ABCD sent out by the light source 10 cyclically ABCDABCD . . . , etc. The portions ABCD here represent portions as measured by the receiver 4. The transmitter 2 does not particularly have any concept of the message being divided into these portions, but from the perspective of the receiver 4 the message M may be considered to consist of these four portions ABCD.

The receiver 4 samples the message in each frame 16 of a sequence of frames captured by the rolling shutter camera (refer again to FIG. 2). The light source 10 emitting the coded light signal only appears in a relatively small footprint within the frame area, covering only the lines labelled 24 in FIG. 2. Hence each frame sees only a respective portion of the overall message. These are the portions called A, B, C, D. Each portion A, B, C, D has a duration Tp which is the duration of the portion labelled 24 in FIG. 2, i.e. the line time of the rolling-shutter camera multiplied by the number of lines covered by the footprint of the light source 10 (or more generally the number of lines in which the coded light signal is visible).

Note: in general the transmitter 2 and receiver 4 are not synchronized and thus there will be no particular relationship between the duration Tp of the measured portions and the message period Tm, and also no relationship between Tm and the frame duration Tframe. It is purely for illustrative purposes, and may be considered as if coincidental, that in the example of FIG. 24 there are five portions A, B, C, D, A fitting exactly into one frame Tframe, and also that each measured portion of the message is exactly one quarter of the message period Tm.

These measured portions A, B, C, D are to be combined to reconstruct the message. This involves time-aligning the message portions to their correct time position within the overall message, then combining the different time-aligned portions to recover the complete message. The process may also be referred to herein as "stitching" or "reassembly". Details for implementing an example of such a process will be discussed in more detail later.

However, whatever process is used for the reconstruction, the message period Tm has to be known, or at least estimated. The estimated message period in the following is labelled $\tilde{T}m$. The present application is concerned with an improved technique for estimating the message duration, in order to assist in the reconstruction of messages.

FIG. 24 shows: the frames of period Tframe, the repeated message of period Tm send out by the light source 10, the measured portions of duration Tp, the position of the measured portions in a reconstruction within the actual message period, and the position of the measured portions in a reconstruction within an estimated message period. Numbers 0, 1, 2, 3, 4 . . . in FIG. 24 refer to the message repetition number.

Figure 25:
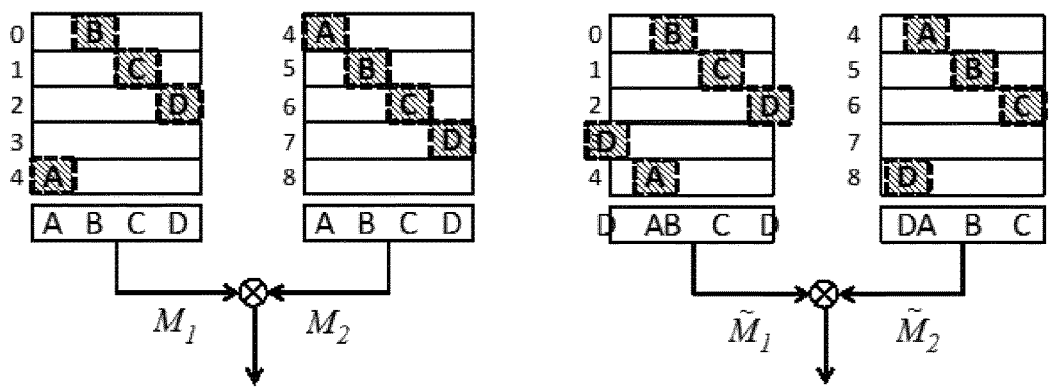

FIG. 25 shows for two different times a reconstruction with the actual message period Tm and a reconstruction with an estimated message period $\tilde{T}m$. Numbers 0, 1, 2, 3, 4 . . . in FIG. 25 refer to the same respective repetitions of the message as shown in FIG. 24. I.e. "0" labels the first instance of the message, a portion B of which is seen in a first frame; "1" labels a subsequent instance of the message, a portion C of which is seen in a subsequent frame; etc.

To reconstruct the message, the signal processing module 14 takes a portion from each of a subset of the received frames, such that the portions from these frames together are at least enough to complete the whole message (or potentially some gaps may be tolerated with error correction). For instance in the example shown, from the first instance of the message 0 the camera 12 captures portion B in a first frame, this being the portion currently appearing in the footprint of the light source 10). In the next frame the camera 12 then captures portion C from message instance 1, and in the next frame after that it captures portion D from message instance 2. Message instance 3 is not observed in any frame as it falls completely outside the footprint. Assuming each portion is captured from the same footprint of the light source 10, and therefore the same lines 24 of the rolling-shutter image capture element, then initially each portion appears to occur at the same time within the frame period. To reconstruct the message therefore, the signal processing module 14 has to time-align the message portions to give them their proper position within message period Tm, or rather the estimated message duration $\tilde{T}m$. This is the stitching or reassembly process mentioned previously. This process depends on the message duration Tm, or rather the estimated message duration $\tilde{T}m$, as the receiver 4 does not have direct knowledge of the transmitter clock. An example of this reconstruction of the message and the manner in which this employs the message duration will be discussed in more detail later under the heading "MESSAGE REASSEMBLY".

The estimated message consists of time-aligned portions (pieces with the same number of "wraps") of the actual message which are distributed in a stretched or contracted fashion depending on deviation of the estimated message period to the actual message period. That is to say, the time positions of the received message portions are shifted in a "wrap-around" fashion so that they correspond to their positions in the transmitted message (wrap-around meaning a portion whose time position goes past the end of the message duration is shifted back to the beginning, i.e. uk=tk mod Tm where uk is the time position of a message portion within the message duration and tk is the absolute time of that portion). Also, the message portions are stretched or contracted slightly relative to the message length. See FIG. 25. For a given portion (e.g. A), its size appears stretched because the estimated message length $\tilde{T}m$ is shorter than the actual length Tm. Further, even for an estimate that was correct, the size of a portions A, B, C, D may be physically stretched or contracted at the transmitter 2 if the clock deviates slightly in frequency over time.

FIG. 25 also illustrates how the reconstruction of the message depends on the estimated message period $\tilde{T}m$. If the estimate is slightly different than the true message period Tm shown on the left hand diagram of FIG. 25, then as shown on the right hand diagram, the time-alignment in the reconstruction process differs. It will be appreciated that if the task is to align the message portions relative to the message period, then regardless of the particular reconstruction process employed, this will be affected by the estimated message duration $\tilde{T}m$—i.e. the estimated timebase or framework within which the message portions are placed.

In principle if the estimate of the message duration was correct, the reconstruction of the message would always be the same regardless of which frames were used to capture the different portions. See the left hand diagram in FIG. 25, in which a first version M1 of the message M reconstructed from message instance 0 to 4 (received in the first four frames) is theoretically identical to a second version of the message M2 reconstructed from message instances 4 to 8 (received in the fourth to seventh frames) if the exact message period Tm is used. However, in practice this is not the case, as the estimate of the message period $\tilde{T}m$ will be imperfect. See the right hand diagram in FIG. 25, showing the difference between a first version of the message $\tilde{M}1$ reconstructed from message instances 0 to 4, and a second version of the message $\tilde{M}2$ reconstructed from message instances 4 to 8, both using the same imperfect estimate of message period Tm.

This fact can be exploited to determine the accuracy of the estimate, and thereby refine the estimate. That is, by taking a quantified measure of similarity such as a measure of correlation, e.g. the dot product, between the two versions of the message M reconstructed using two different subsets of the captured frames. These subsets could overlap somewhat, such as shown in FIG. 25, or could be completely different.

Figure 26:
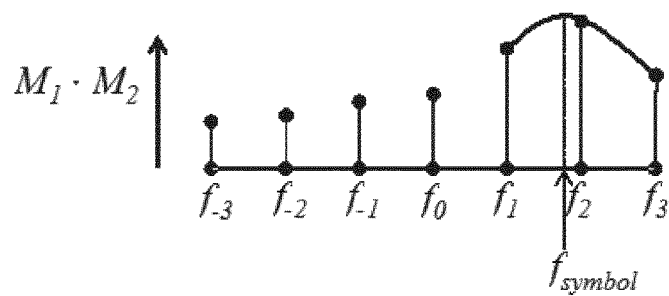

Referring to FIG. 26, to reconstruct the message period, the signal processing module 14 searches a discrete grid of possible message periods for the value where two messages $\tilde{M}1$ and $\tilde{M}2$, reconstructed at different times, are the most similar. Note that the different trial message periods correspond to different possible values $f_3 \ldots f_3$ of the transmit symbol frequency, fsymbol, which is what is shown in FIG. 26.

As shown, for the pair of first and second subsets of frames, the reconstruction is performed using a different respective trial value of the message period $\tilde{T}m$ (with the same pair of subsets used for each trial value), and the value which causes the pair of reconstructed messages to be most similar is the best estimate. As measure of similarity the dot product between the two messages may be taken. Alternatively other methods of measuring the similarity between two sets of samples will in themselves be familiar to a person skilled in the art. For instance a sum of absolute differences, or sum of squared differences between the samples may be used. In these cases preferably the difference between only observed samples should be used. Note: the dot product is beneficial in this respect, in that it automatically ignores unobserved samples as they are zero, thus removing their influence on the outcome.

At the frequency of maximum similarity a parabolic curve is fitted and the recovered symbol frequency is the position of the maximum of the parabola. The message is then reconstructed again using this best estimate of the message period.

Alternatively, other fits or models could be used to extrapolate the best estimate, not necessarily parabolic, e.g. any other quadratic or higher order polynomial fit (quadratic, cubic, etc.). Or in other alternatives, it is not necessary to perform a fit, e.g. the signal processing could just take the trial value with the greatest correlation as the best estimate (the message period corresponding to f2 in the example shown). In this case the already-computed first or second version of the message computed using this best trial value may be taken as the output (e.g. $\tilde{M}1$ or $\tilde{M}2$ as computed using f2), rather than re-computing.

Note that the message period Tm is related to the transmit symbol frequency fsymbol by Tm=Nsymbol·fsymbol, where Nsymbol is the number of symbols in the message (including any idle period symbols) and can be assumed to be known to the receiver 4, e.g. because it is fixed. Hence the symbol frequency may be considered as a measure of the message period or vice versa, and by considering a discrete set of message periods this implies considering a discrete set of symbol periods and vice versa. Some of the disclosure herein may talk in terms of symbol frequency or clock recovery, because it is the inaccuracy of the oscillator in the transmitter which is the root cause of the changing message lengths, but it will be understood that for the present purposes this may effectively imply or correspond to a measure of the message period which is ultimately used for the message reassembly. Also in a later stage in the decoding process, individual symbols may be required to be detected, and at that stage it is required to know the symbol clock. The techniques disclosed herein may therefore also be used to derive the symbol clock or frequency for these purposes.

For ease of reference, some definitions of the variable names used herein are summarized below:
$\tilde{x}$: estimated value of actual value x
$f_{symbol}$: symbol frequency
$N_{symbol}$: number of symbols per message
$T_m$: message duration
$M(t): t \in [0, T_m]$: message
$t_k$: time of sample k
$u_k$: time of sample k in message Message Duration:

$$T_m = 1/(N_{symbol} f_{symbol})$$

$$\tilde{T}_m = 1/(N_{symbol} \tilde{f}_{symbol})$$

$$\tilde{T}_m = T_m + \Delta T_m$$

Derivation of Sample Positions $$u_k = t_k \bmod T_m$$

$$u_k = t_k \bmod \tilde{T}_m$$

$$\tilde{M}(\tilde{u}_k) = M(u_k)$$

$$t_k = n \cdot T_m + u_k$$

$$\tilde{u}_k = u_k - n \cdot \Delta T_m \bmod \tilde{T}_m$$

From the discussion above, one can see that if $n \cdot \Delta T_m$ is small compared to the message duration, the message portions are cyclically shifted in time proportionally with the number of wraps n, which increases with the frame number of the sample. The estimated message consists of pieces (portions with the same number of wraps) of the actual message which are distributed in a stretched or contracted fashion. An offset in the number of wraps results in a cyclic shift, so estimated messages reconstructed from different timespans are shifted in time.

As mentioned above, the measure of similarity is taken between any two (or more) versions of the message M reconstructed using different subsets of the captured frames, and these subsets could partially overlap such as shown in FIG. 25, or could be completely different. In the former case, in embodiments this may be used to speed up the clock estimation process: as soon as a part of the message is observed a second time it can be put in M2, so the comparing of message versions can be started early (before a completely new version of the message is necessarily received). The time difference between a sample of M1 and the corresponding sample of M2 determines the sensitivity of correlation to clock differences. Also it is possible to average a few samples in M1 before putting new samples in M2. I.e. when a footprint is rolling usually there is some overlap between the parts of the message received in two consecutive frames (the concept of rolling is discussed in more detail later); so in order to increase the signal-to-noise ratio, samples which are close to each other in time and ending at the same position in the message can be averaged.

In further embodiments, the message may include redundant information in each message in order to improve the efficiency of detection based on the redundant information. For instance this redundant information may comprise a parity bit, or an error detection code such as a CRC (cyclic redundancy check) code (e.g. one parity bit or one CRC byte per message repetition). The presence of such redundant information can be exploited in conjunction with the fact that an incorrect $\tilde{T}_m$ is corrupting the message. To do this, the signal processing module 14 at the receiver 4 keeps on estimating the symbol frequency until it detects a valid CRC (or such like) for the current version of the reconstructed message, and then it keeps the currently estimated frequency for use in reconstructing subsequent versions of the messages or even new messages until the CRC fails again. This means the signal processing module 14 does not have to check all candidate frequencies, which is beneficial as this would require reconstruction of all possible candidates and therefore cost a degree of processing power. The reconstruction is very sensitive to the right frequency so it is possible that no candidate frequency will have a valid CRC for the message. Nonetheless, if the CRC is detected to be valid, this provides a useful opportunity to stop the frequency estimation temporarily.

Note also: the above assumes that the nominal value of the message period Tm is a pre-determined property of the transmitter 2, known at the receiver 4. In this case, the above techniques may be used to fine-tune the estimate $\tilde{T}_m$ to accommodate for slight deviation in the actual value of the transmitted message period relative to the nominal value. I.e. the search range may be limited to a small number of values around the nominal value. The techniques disclosed herein have been found to work for at least clocks with deviations of up to +/−4%, up to which the inventors so far have not observed any cases where the message period failed to be recovered.

Further, the disclosure herein also allows message period recovery when the exact nominal message period is not known, but when rather only an approximate value is available, or even when the receiver 4 has no pre-known nominal or approximate value of the message period at all. This may be achieved by increasing the number of trial frequencies. At some point there may be experienced multiple peaks in the correlation which are close to each other in amplitude, presenting multiple apparent solutions, but in this case the reconstruction of the false peaks will fail because of an incorrect CRC. Thus to accommodate the possible presence multiple peaks, the different peaks may be explored until a valid CRC is found (or a valid result of some other such error check, e.g. parity check).

In general, the applicability of the above-disclosed techniques is not limited to any particular range of clock variations or any particular initial accuracy of approximate value, as a wider uncertainty can always be accommodated by spending more processing resource on a wider search. Any particular design may be considered a trade-off between the uncertainty one wishes to accommodate, the processing resources one is prepared to spend, and the probability of failure one is prepared to tolerate. Indeed even without any recovery of the message period, the message re-assembly described below can still work, and it is just a matter of what error probability is acceptable for the application in question—with a repeating message, one will still successfully receive the message at least on some occasions and/or in some circumstances (especially if error correction is used), and it is a matter of design choice as to what failure rate one will tolerate (e.g. some applications may be more critical than others). The detection of the message period in accordance with the above is advantageous as it improves robustness against uncertainty in the transmit clock, but it is not essential for message reassembly per se.

The following now describes some examples of a message transmission format and reconstruction process for implementing the time alignment of the message portions from a given combination of frames. Note the following is only illustrative, to show an example context in which the invention may be employed. In other embodiments, different message formats, modulation schemes, and/or reconstruction mechanisms may also benefit from the idea of using a measure of similarity between different versions of the message to determine the estimated message period.

Example Modulation Scheme

Figure 5:
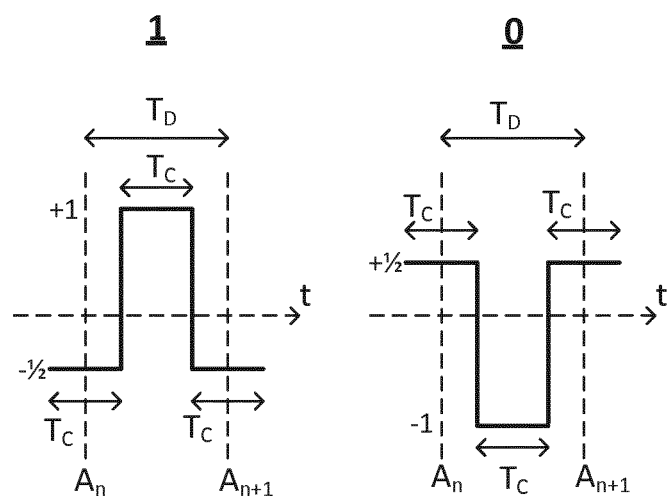

Ternary Manchester now forms a part of the state of the art and is thus known to skilled person, but it is summarized again here for completeness. At the transmitter, each data bit to be transmitted is mapped to a channel symbol in the form of a respective unit pulse. According to this scheme, there are two possible units, in the form of positive and negative "hat" functions as shown in FIG. 5. The pulse mapped to a data bit of value 1 is shown on the left hand side of FIG. 5, and the pulse mapped to a data bit of value 0 is shown on the right hand side of FIG. 5. A data bit is a bit of actual information to be transmitted, sometimes referred to as "user data" (even if not explicitly created by a user). The data bit period is labelled TD in FIG. 5, with the boundaries between user bit periods shown with vertical dashed lines.

Each unit pulse comprises a sequence of elementary channel periods of length TC in time, smaller than the data bit period. Each elementary channel period conveys just one of the elementary levels that the coded signal can take (one ternary Manchester symbol), and is not alone sufficient to convey data without being modulated into a composite channel symbol. Hence each pulse of length TD is the smallest or most fundamental unit of information content that can be conveyed using the coding scheme in question.

In the ternary Manchester code, each unit hat function comprises a sequence of three elementary channel periods of length TC in time, each half the length of the data bit period TD (TD=2TC). The three elementary periods for a respective data bit are contiguous, with the middle of the three being located at the center of the respective data bit period, so that the adjacent first and third elementary channel periods straddle the beginning and end boundaries of the data bit period respectively by half an elementary channel period TC either side.

For a data bit of value 1, this is mapped to the positive hat function shown on the left of FIG. 5. The positive hat function comprises: a first elementary channel period of height −½ centered on the beginning (earlier) boundary of the respective data bit period, followed by second (middle) elementary channel period of height +1 being centered on the respective data bit period, followed by a third elementary channel symbol of height −½ centered on the end (later) boundary of the respective data bit period. The "height" at this stage may be represented in any suitable terms such as a dimensionless digital value (ultimately to be represented by the modulated signal property, e.g. amplitude or frequency).

For a data bit of value 0, this is mapped to the negative hat function shown on the right of FIG. 5. The negative hat function comprises: a first elementary channel period of height +½ centered on the beginning (earlier) boundary of the respective data bit period, followed by second (middle) elementary channel period of height −1 being centered on the respective data bit period, followed by a third elementary channel period of height +½ centered on the end (later) boundary of the respective data bit period.

Figure 6:
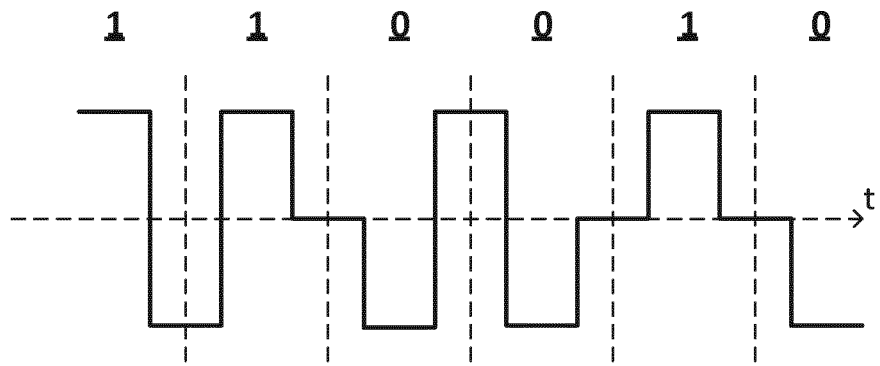

To create the coded bit stream to be transmitted, the hat functions of adjacent user bits are added to one another, offset by the times of their respective bit periods. Because the hat functions overlap across the boundaries between data bit periods, the functions add in the overlapping regions between adjacent data bits. That is, the hat functions are joined along the boundaries, so the earlier boundary An of one data bit period is joined with the later bit boundary An+1 of the preceding adjacent data bit period, with the height of the signal being summed where the two adjacent pulses overlap. An example of a resulting sequence of channel symbols in the time domain is shown in FIG. 6.

Where two adjacent data bits are of value 1, this means the two overlapping elementary channel periods of height −½ add to a height of −1. Where two adjacent data bits are of value 0, the two overlapping elementary channel periods of height +½ add to height +1. Where two adjacent data bits are of different values, the two overlapping elementary channel periods of height +½ and −½ add to 0. Thus in the coded stream, each user bit period (each unit pulse) takes the form of either a positive pulse of a rectangular wave when a user bit of value 1 is sandwiched between two adjacent user bits of value 1, or a negative pulse of a rectangular wave when a user bit of value 0 is sandwiched between two adjacent user bits of value 0, or an uneven pulse of one or four possible configurations with straight edges when at least one of the adjacent user bits is different.

In an equivalent variant, the mapping of data bit values 0 and 1 to positive and negative hat functions may be reversed.

The resulting signal (e.g. that of FIG. 6) is then converted into a variation in the modulated property of the signal output by the transmitting light source (e.g. whether represented in terms of amplitude or frequency). For example, elementary channel symbol −1 may be represented by a low light output level, the elementary channel symbol +1 may be represented by a high output light level, and the elementary channel symbol 0 may be represented by an intermediate light level between the high and low.

The ternary Manchester code can be advantageous as it provides a smoother transition when the data bits change value than a conventional Manchester code, and results in a spectrum in the frequency domain that is more suppressed around low frequencies where interference such as mains hum may occur. However, the applicability of the present disclosure is not limited to ternary Manchester and in other embodiments other examples of suitable coding schemes may be used, e.g. a conventional (binary) Manchester code, or other conventional binary or ternary lines codes.

Message Format and Reassembly Overview

A message is cyclically repeated, and at the receiver the message is effectively re-assembled over time (e.g. this can for certain messages actually take 1 or 2 seconds, e.g. so 30-60 frames). In order to enable this, the following describes a particular data format for encoding information in the light.

Part of the decoding of the signal in turn is described using a method referred to herein as "reassembly". To facilitate the decoding, the message duration and/or the Texp of the camera are tweaked in a manner that enables a cheap rolling shutter camera to detect a complete message fairly quickly.

Once the message is re-assembled it will be equalized. The "normal" approach is to take the message and to effectively use a slicer to determine the exact timing of the signal and then equalize it. However, according to embodiments of the following, this can be achieved in a smart manner using a robust Wiener filter implementation that is rather efficient (preferably such that the entire decoding algorithm can be implemented on standard run-of-the-mill mobile phones).

The robust Wiener filter takes into consideration the uncertainty of the channel and in this manner can reduce the inter-symbol interference (ISI). In the following embodiments this filter is used following re-assembly, but note that it may be used in other systems as well (not limited just to equalizing the effect of a rolling-shutter nor even just to coded light applications).

Message Format

The following describes a message format that allows for a reliable combination of the information of multiple video frames such that messages longer than the "footprint", and even messages having a duration of many frames can be captured and decoded. Moreover, the signal format allows for asynchronous (Wiener-like) equalization to undo the ISI caused by the camera at the receiver. Further, the frequency content of the messages can be such that there is no visible flicker or stroboscopic effects, even for message lengths having a repetition frequency of, e.g., 18 Hz (very sensitive flicker frequency).

Figure 7:
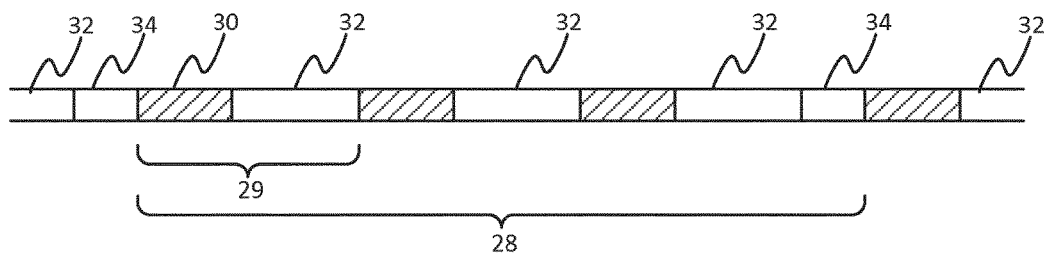

An example of such a message format is shown in FIG. 7. To ensure the message can be captured even given a small footprint, the coded light signal is transmitted according to a format whereby the same message 28 is repeated multiple times in succession, and the timing of this is configured relative to the exposure time of the camera—or the range of possible exposure times of anticipated cameras—such that the message "rolls" over multiple frames. That is, such that a different part of the message is seen by the camera in each of a plurality of different frames, in a manner that allows the full message to be built up over time as different parts of the message are seen. The issue here is therefore the manner in which the message length (duration) Tm is chosen relative to the exposure time Texp or anticipated exposure times, such that in reconstruction the rolling shutter camera images another part of the message in every frame (wherein the parts of the message are not necessarily consecutive, and in fact for rolling shutter cameras they will often not be consecutive). The message timing may be adapted in response to actual knowledge of a particular camera's exposure Texp being fed back via a suitable back channel such as an RF channel between receiver 4 and transmitter 2 (a "negotiated format"), or alternatively the timing may be formatted in a predetermined fashion to anticipate a range of possible exposure times values Texp of cameras the format is designed to accommodate (a "universal format").

In embodiments, aside from the length (duration) of the message's actual data content (payload) 30, the message length Tm may be selected by including an inter-message idle period (IMIP) 34 between repeated instances of the same message. That way, even if the message content alone would result in each frame seeing more-or-less the same part of the message, the inter-message idle period can be used to break this behavior and instead achieve the "rolling" condition discussed above. In embodiments the inter-message idle period may be adapted given feedback of Texp ("negotiated format"), or may be predetermined to accommodate a range of possible values of Texp ("universal format").

As mentioned, the rolling condition is linked to the exposure time (i.e. line exposure time) Texp of the rolling-shutter camera. There is no one single solution to this, it is more a matter of avoiding combinations of Tm and Texp that do not meet the condition (discussed in more detail shortly). In the case of seeking a universal format, the inventors have discovered that sufficient solutions can be assured to be available as long as Texp<=33 ms or ($\frac{1}{30}$)s (approximately).

Another issue is inter-symbol interference (ISI), which is a result of the filtering effect of the exposure of each line (effectively a box filter applied in the time domain as each line is exposed). To mitigate this, in embodiments the message format is arranged such that each instance of the message comprises a plurality of individual packets 29 (e.g. at least three) and includes an inter-packet idle period (IPIP) 32 between each packet. In embodiments, the inter-packet idle period follows each packet, with the inter-message idle period (IMIP) 34 tagged on the end after the last packet (there could even be only one packet, with the IPIP 32 and potentially IMIP 34 following).

Inter-symbol interference is then a function of packet length and inter-packet idle period. The more data symbols there are in a row, the more inter-symbol interference (ISI). Therefore it is desirable to keep the packet length small with good sized gaps in between. The idle gaps (no data, e.g. all zeros) between bursts of data helps to mitigate the inter-symbol interference, as does keeping the packet length short. Again these properties may be adapted in response to actual knowledge of a particular camera's exposure time Texp being fed back via a suitable back channel such as an RF channel between receiver 4 and transmitter 2 ("negotiated format"), or alternatively the timing may be formatted in a predetermined fashion to anticipate a range of possible exposure time values Texp of cameras the format is designed to accommodate ("universal format"). In embodiments, the inventors have discovered that a packet length no longer than 9 bits separated by an inter-packet idle period of at least Texp provides good performance in terms of mitigating ISI. By convenient coincidence, 9 bits also advantageously allows for one byte of data plus a synchronization bit. Nonetheless, in other embodiments a packet length of up to 12 bits, or even up to 17 bits may be tolerated.

As well as achieving "rolling", another potential issue is synchronization. The receiver has a template of the message format which is uses to synchronize with the received signal—e.g. it knows that after a gap of the IPIP+IMIP, to expect a synchronization bit, then a byte of data, then the IPIP, then another synchronization bit and byte of data, etc. By comparing this template with the received coded light signal, the receiver can synchronize with the signal. In embodiments, in order to assist synchronization, the inventors have found that the inter-message idle period should preferably be at least 4 symbols of the relevant modulation code, e.g. 4 ternary Manchester symbols.

Given the above considerations, an exemplary message format comprises:
(i) use of a signal format where a message is cyclically repeated (many times) by the transmitter, thus allowing a (temporal) recombination of footprints from consecutive video frames, each footprint containing a partial received message, for obtaining a complete received message—message size may be chosen such that by cyclic repetition eventually the entire message can be recovered;
(ii) a message having relatively short packets (e.g. of 9 bits), separated by inter-packet idle periods for allowing an equalizer to reconstruct the original transmitted waveform in the presence of heavy ISI caused by an un-controllable camera exposure time setting; and
(iii) using a form of Ternary Manchester (TM) as a DC-free modulation code, leading to extra suppression of low frequency components, thus eliminating flicker at low symbol frequencies.

Variations are also possible. For example, while the preferred modulation code is ternary Manchester (which may be abbreviated by the initials TM), other codes could alternatively be used (preferably DC-free or low DC content, with no visible flicker), e.g. conventional Manchester or non-return to zero (NRZ). The following also further describes various particularly advantageous choices for the format parameters (e.g. IMIP). In further embodiments, the IPIP may be tuned to the maximum exposure time. The TM-symbol length may also be tuned to exposure time when exposure time>IPIP. In yet further embodiments, guided descrambling may be used for medium length messages, and/or unscrambled short packets for short messages.

Returning to FIG. 2, some further details are now discussed. As mentioned, existing literature assumes that the source to be decoded covers almost or entirely every frame. It is assumed that the duration of a single message to be decoded is such that in can be captured in the footprint of the source in a single frame. It is recognized that the "hidden lines" 26 can form a problem because of the synchronicity between the data packets and the shooting of the frames. It is suggested that a message may be repeated such that at least one repetition satisfies the condition of being captured completely within a single frame. However, existing data formats for coded light can still suffer from a number of problems.

As already discussed, a particular problem in using a rolling shutter camera for coded light detection arises because the light source serving as a coded light transmitter may cover only a fraction of the lines of each frame (see again FIG. 2). Actually, only the lines covering the source contain pixels that record the intensity variations of the coded light source. All the remaining lines and pixels do not contain coded light information related to the source of interest. If the source is small, one only obtains short, temporally-interrupted views of the coded light source in each frame and therefore the existing techniques only allow for very short messages.

Another issue is that current smartphones such as iPhones and iPads do not allow for control of the exposure time Texp and ISO by an "app". Existing automatic built-in control algorithms often lead to long exposure times that, after camera detection, lead to heavy inter-symbol interference (ISI) between the digital symbols that are sequentially transmitted by the light source.

Further, current LED driver technology only allows for cheap, energy-efficient solutions if the bandwidth (symbol rate) of the transmitted digital signal is very limited (say a symbol rate between 1 and 8 kHz). For such low frequencies, flicker and stroboscopic effects may become serious, unless special precautions are taken in the signal format for suppressing low frequencies. Having just a DC-free code does not always suffice.

The present disclosure describes a signal format that allows for a reliable combination of the information of multiple video frames such that messages longer than the "footprint", and even messages having a duration of many frames can be captured and decoded. Moreover, the signal format allows for asynchronous (Wiener-like) equalization to undo the ISI caused by the camera at the receiver. Finally, the frequency content of the messages can be such that there are no visible flicker or stroboscopic effects, even for message lengths having a repetition frequency of, e.g., 18 Hz (very sensitive flicker frequency).

Figure 9:
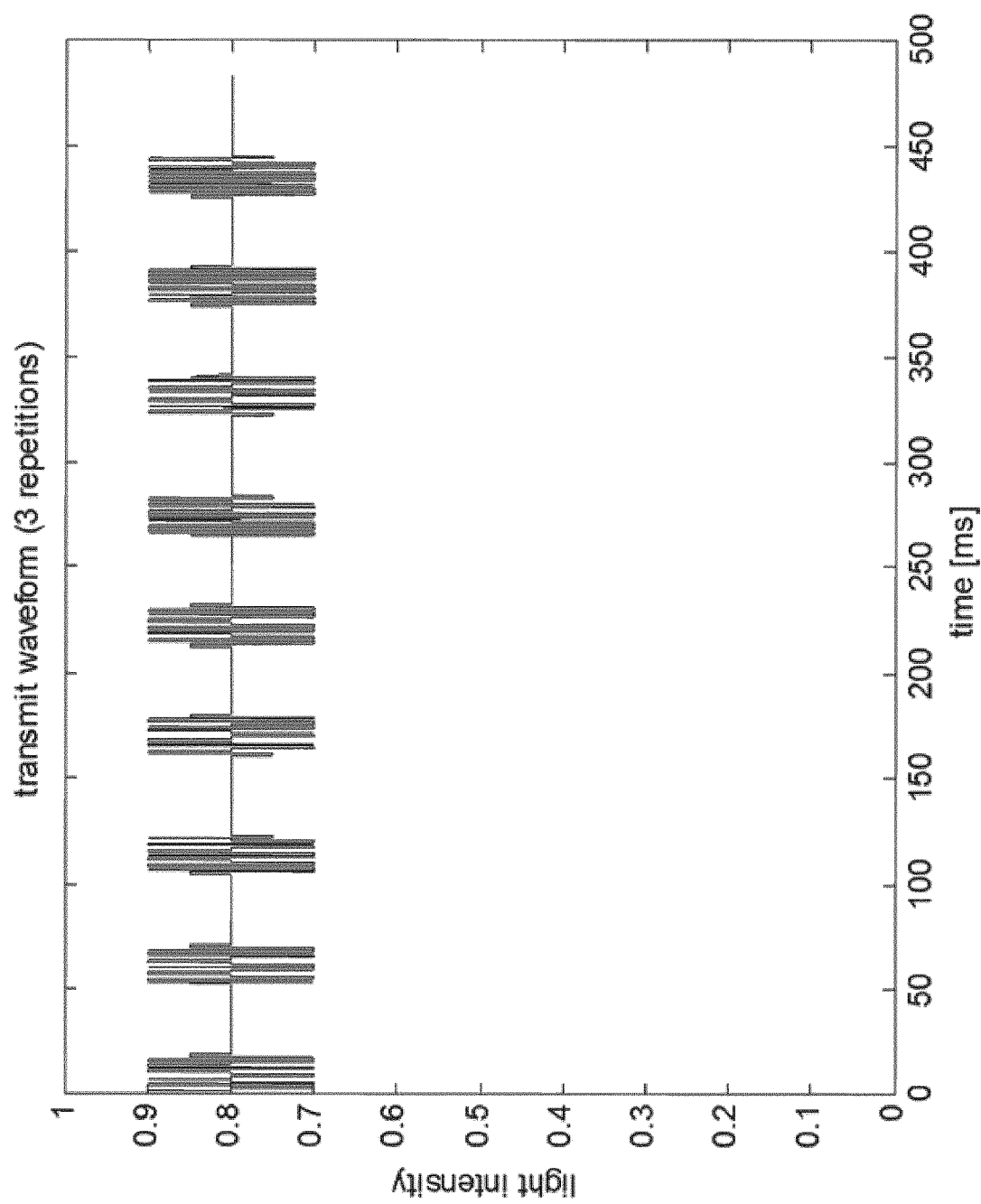
FIG. 9 shows three repetitions of a cyclically repeated message.

A snapshot of a typical coded-light signal at the transmitter is depicted in FIG. 9, which is described next. It is assumed that the light source can vary its (instantaneously) emitted light intensity between 0 and 1. In FIG. 9, the average light intensity (DC) is set to 0.8, and the amplitude of the coded light signal equals 0.1. The coded light signal is superimposed onto the average (DC) light level.

A message, in this example having a duration of 161 ms, consists of 3 packets, each packet comprising 9 TM-encoded bits. A message is cyclically repeated by the transmitter (3 repetitions are shown in FIG. 9). The TM-symbol rate equals 1 kHz (1000 TM-symbols per second).

Each packet of a message in this example is trailed by an inter-packet idle period of 33 TM-symbols (~33 ms). At the end of each message, there is an (extra) inter-message idle period of 5 TM-symbols, resulting in a total idle period of 33+5=38 idle symbols between the third packet of the current message and the first packet of the next message. FIG. 9 depicts 3 repetitions of a message, where each message consists of 3 packets.

Figure 10:
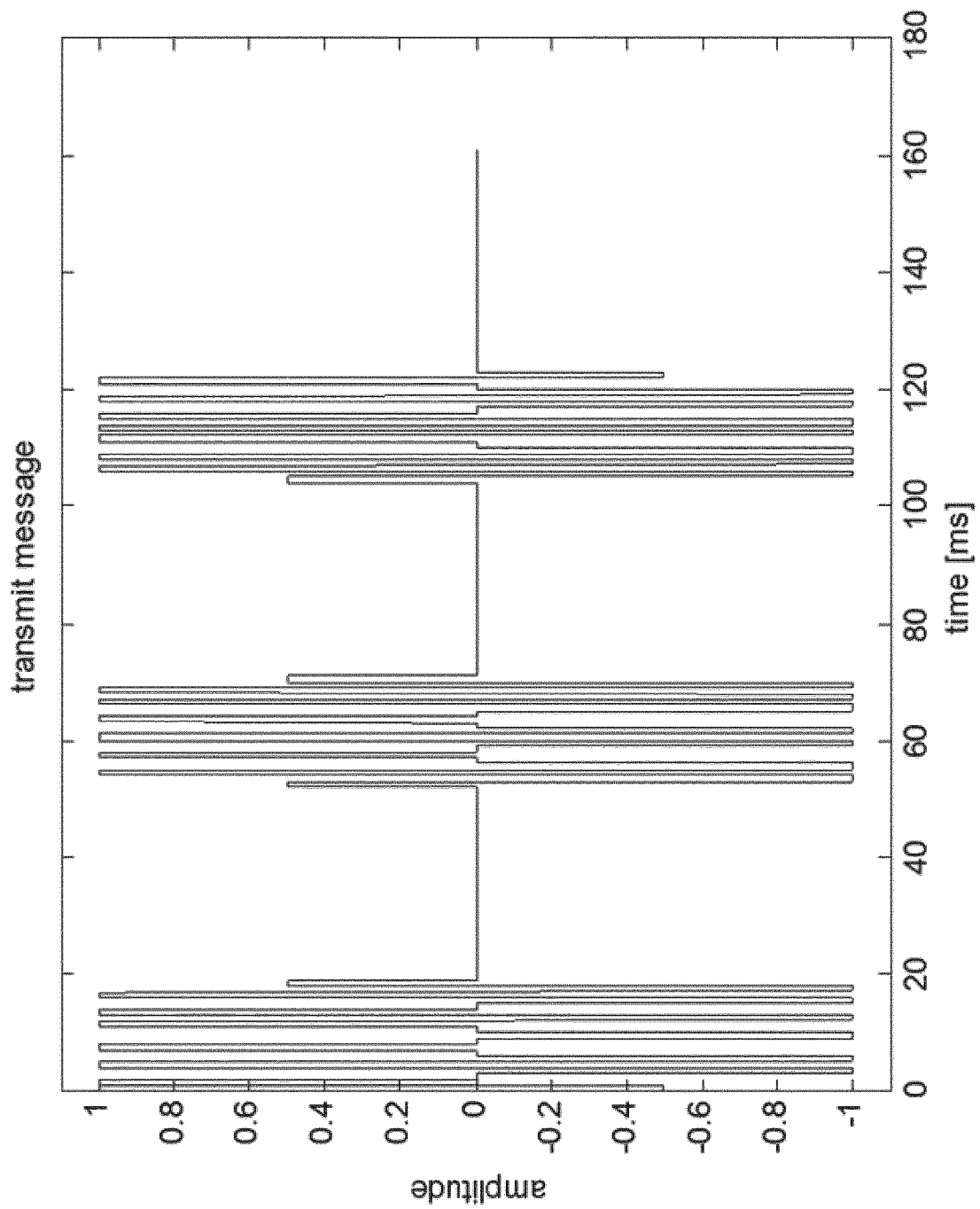
FIG. 10 shows a message consisting of three packets.

FIG. 10 depicts a single message of FIG. 9, where the DC has been removed and the amplitude of the signal has been made equal to 1. The active part of each packet consists of 9 TM-encoded bits, leading to 2·9+1=19 TM symbols. Note that the first and the last TM symbol of each packet have an amplitude of ±0.5, consistent with TM encoding rules. The message format, as described in FIGS. 9 and 10, can be decoded using a camera that has any given Texp such that Texp≤1/30. In general all parameters such as e.g., TM-symbol rate, idle periods, modulation code may be selected to facilitate detection.

The reason for cyclically repeating a message is that, at each frame of a rolling shutter camera movie, only a small part of the transmitted message may be recoverable. The size of that part depends on the size of the light source in the images of the camera (footprint), and of the duration of the message. For instance, if the size of the light source is such that only 14% of the lines of a frame are covered by the light source, and if the duration of the message is in the order of 5 frames (assuming a recording speed of 30 frames/second), only about 3% of a message is potentially recoverable from a single movie frame.

If the message duration is carefully chosen with respect to the frame rate of the movie, consecutive frames of the movie reveal different parts of the repeated message such that eventually the whole message is recovered.

Figure 8:
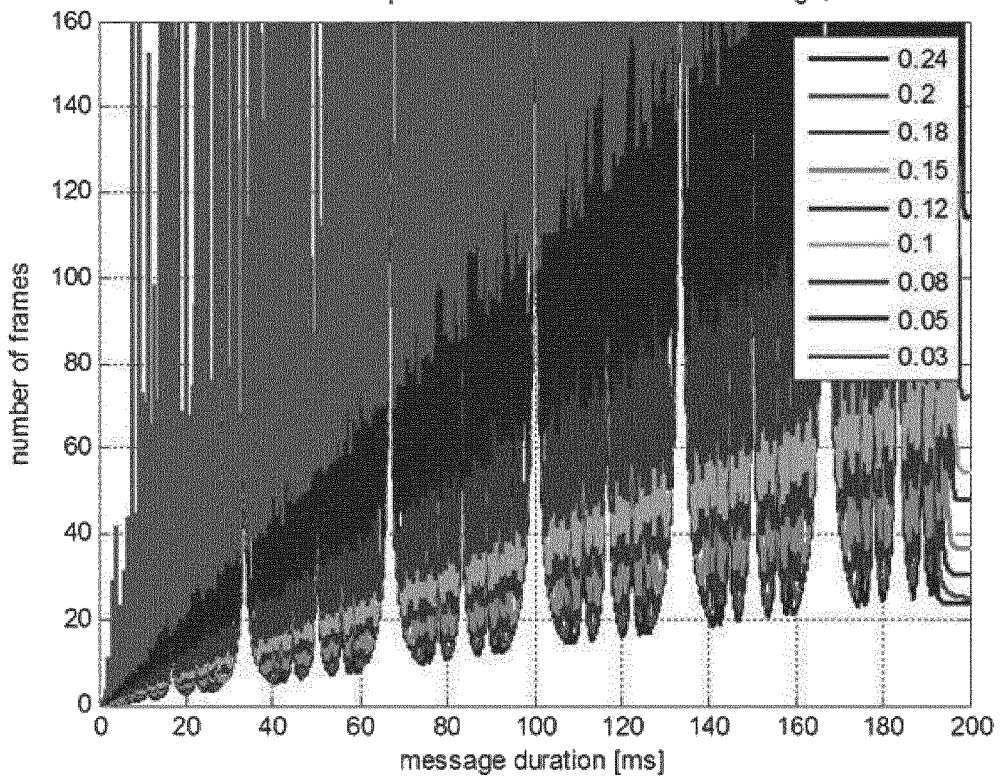
FIG. 8 is a graph of a number of frames required for message reassembly.

FIG. 8 depicts how the number of frames required for obtaining a complete message, depends on the message duration and the size of the footprint in the image for a frame rate of 29.97 fps.

The following considers the relationship shown in FIG. 8. For each frame of duration Tf, a view of duration Tfootprint of the message is obtained. A collection of N footprints of N consecutive frames has to cover at least 1 complete message. The footprints have to "roll" over the messages. Footprints have a repetition frequency equal to the frame rate (=29.97 Hz), messages have a repetition frequency of 1/Tm, and these frequencies must be "sufficiently" different.

It may also be desired to minimize N, as a large N leads to large latencies. Also for a "small" footprint, one may desire a small N, e.g. N=30~1 second.

Transmitter frequency deviations lead to Tm variations. Some deviations may lead to "slow rolling" or even absence of rolling. N has to remain reasonable for a certain range of message durations around a nominal value.

Now consider what happens to covering a message with footprints if:

relative footprint α=Tfootprint/Tf=0.4

0<α≤1, (in practice e.g. 0<α≤0.88 due to hidden lines)

If Tm is about Tf, the message barely rolls (each frame sees practically the same part of the message). But if Tm is about 1.5 times Tf, the message "switches" so that every other frame sees alternate parts of the message, but some parts are repeatedly missed.

It turns out that, if α<1, one obtains "non-rolling" footprints if the message durations Tm are a multiple of the frame duration Tf. If α<0.5, one obtains "switching" footprints if Tm is a half-integer multiple of Tf (0.5, 1.5, 2.5, . . . ).

In general, if $1/(n+1)<\alpha \leq 1/n$, where n is integer, then one encounters "non-rolling" footprints if:

$$\frac{T_m}{T_f} \in \left\{ \frac{k}{m} \,\middle|\, m=1, \ldots, n, k \in N^+ \right\}$$

It turns out that the rolling may already be insufficient if the above ratio is "close" to one of the "non-rolling" ratios. It also turns out that the rolling may already be insufficient if the above ratio is "close" to one of the "non-rolling" ratios.

The result is a complicated relationship as seen in FIG. 8.

Modulation Code

The preferred modulation code for low bit rates is ternary Manchester (TM) because of the extra suppression of low frequency components that may lead to flicker. Low bit rates might be imperative because of two reasons: (i) the limited affordable complexity and minimum required efficiency for drivers of the LED light sources; and/or (ii) for obtaining a signaling speed that can be recovered for very long exposure times.

Comparing NRZ, Manchester and ternary Manchester, note that NRZ (actually: no modulation code) has a very high DC content. The Manchester modulation code, well-known from magnetic recording, and also proposed for the IEEE Visible Light Communication (VLC) standard, is a so-called DC-free code, i.e., the spectral content at frequency zero equals 0. The Ternary Manchester modulation code is a so-called $DC^2$-free modulation code, implying that the spectral density around DC remains much smaller compared to a DC-free code like Manchester. In the spectra for low frequencies, Tm is therefore advantageous compared to Manchester. For flicker, frequencies up to 100 Hz are important.

Since the signal format makes use of relatively short packets, interspersed with idle symbols, one can guarantee a message to be $DC^2$-free, by letting each packet be $DC^2$-free. This is accomplished by modulating the user bits using the TM impulse response {−0.5, 1, −0.5}. Note that a packet of 9 user bits leads to a TM-encoded packet of 19 TM-symbols.

For larger bit rates, other modulation codes, maybe even multi-level DC-free modulation codes (e.g. quaternary Manchester) also can be envisioned, provided the spectral densities do not lead to visible flicker.

The modulation codes to be used can be defined in a manner that allows for some freedom in the actual implementation of the driver, e.g. for drivers having an Amplitude Modulation (AM) implementation or for drivers having a Pulse Width Modulation (PWM) implementation. This implies that, in contrast to traditional modulation formats, the actual shape of the waveforms to be transmitted is not exactly defined for coded light.

A preferred way of defining a modulation code for coded light would be to define the rules and acceptable values of the output of a full-T moving-average filter applied to a modulator output waveform at the optimum sampling points.

Packet Length

Turning to the question of packet length, the packet length is preferably chosen such that the worst case data pattern is still recoverable under worst case exposure times.

Figure 11:
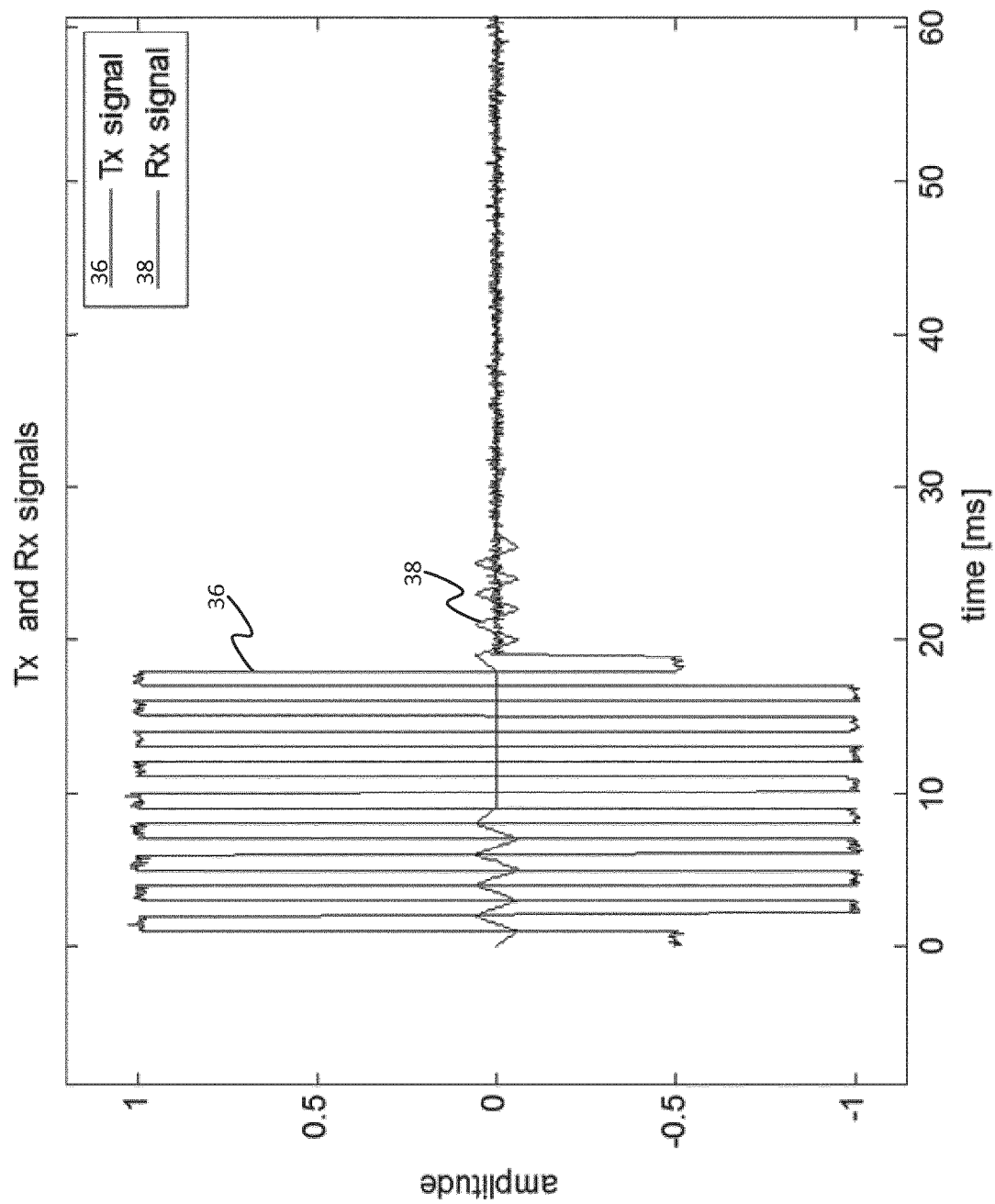
FIG. 11 shows transmitted and received signals in the time domain.

An example is shown in FIG. 11. Consider a transmitted waveform 36 corresponding to a TM-encoded packet of 9 bits consisting of all ones (fsymbol=1 kHz). If this waveform is detected by a camera having a Texp=1/125 [s], one can obtain a 1-dimensional received waveform 38 at the output of the camera, by proper processing of a sequence of video frames. Note that the received signal, which is a distorted version of the transmitted signal, can be seen as would be generated by the camera, by convolving the transmitted signal by a rectangular box function, corresponding to a FIR filter action of Texp (moving average over Texp seconds).

The moving average filtering of Texp leads to inter symbol interference (ISI) between the TM-symbols of the packet. Note the reduction of the amplitude of the received signal with respect to the incoming transmitted signal. Also note that in the last half of the packet the amplitude of the received signal has been reduced to zero. Finally note that the received signal extends beyond the transmitted signal by Texp=8 ms because of the causal FIR-type filtering by Texp. It is the task of the signal processing in the receiver to reconstruct the transmitted signal from the received signal.

Figure 12:
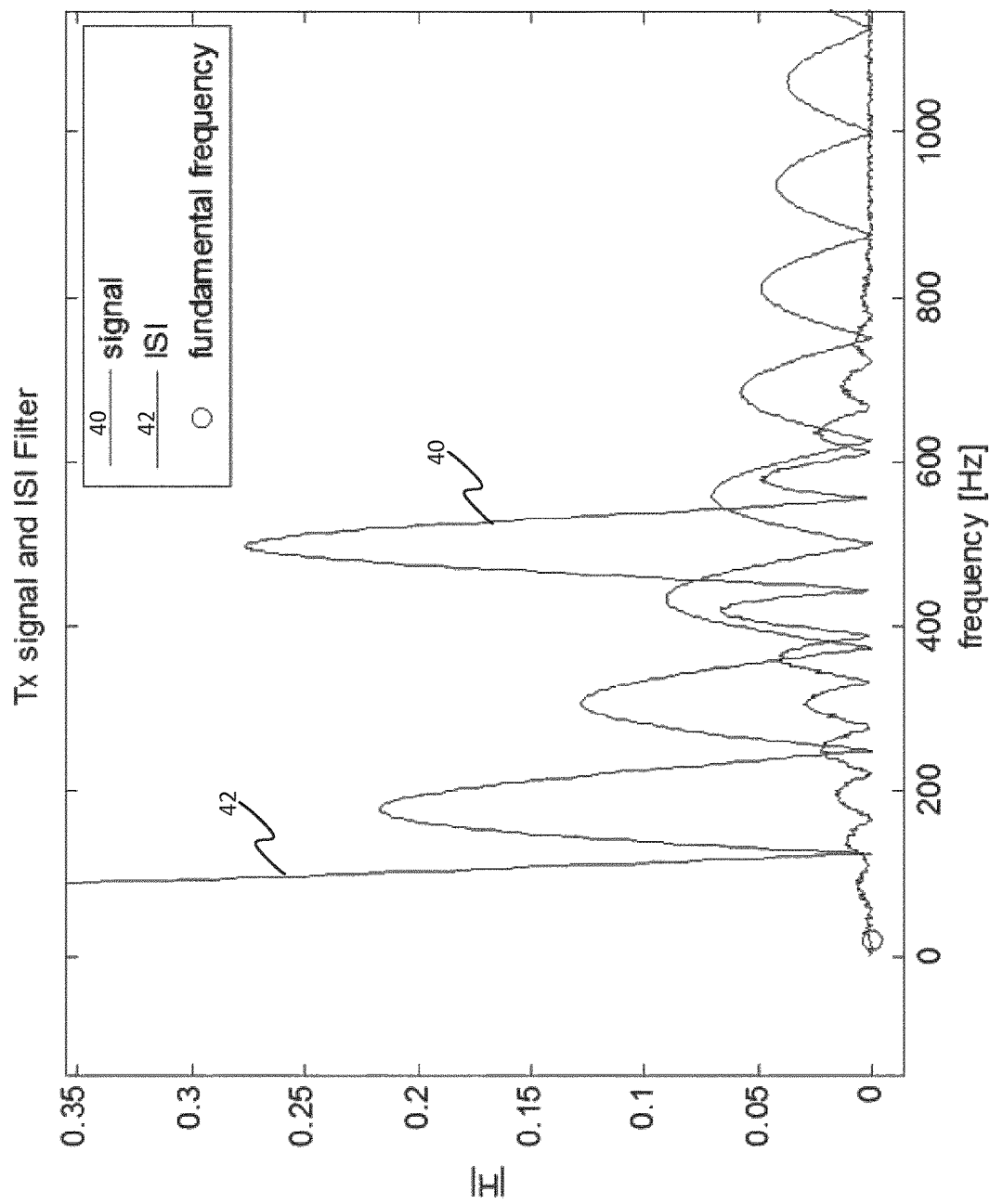
FIG. 12 shows a transmitted signal and ISI in the frequency domain.

FIG. 12 shows the same situation in the frequency domain. The curve 40 represents the absolute value of the spectral representation (the Fourier transform) of a single 9-bit TM-encoded packet consisting off all ones. The curve 42 represents the absolute value of the transfer function of the "Texp moving average filter". The received signal in the frequency domain is the dot product of both spectral representations. Note that the zeros of the ISI filter are particularly detrimental to the received signal, since the signal at those frequencies (and at the frequencies in the neighborhood of the zeros) effectively are removed from the transmitted signal.

If one desires that the transmitted signal is recoverable from the received signal, it is required that at least sufficient signal energy remains after filtering the transmitted signal with the ISI filter for all reasonable choices of Texp. For this to happen, the spectral representation of the transmitted signal has to be sufficiently "spread" across many frequencies (for all possible choices of the bit content of a packet). This turns out to be the case if the packet length is in the order of 9 bit.

On the other hand, if one would make a packet (consisting of all ones) longer than 9 bits (say 17 bits), the spectral representation of such a long packet would still be concentrated around 500 Hz, but its spectral width would be about ½ of the original packet. It turns out that in that case too much signal energy is destroyed by the ISI filter.

The inventors have found that, using TM modulation with fsymbol=1 kHz, for a packet length from say 9 to 12 bits, one can recover the transmitted signal sufficiently accurately for all Texp≤(1/30)s, provided the inter-packet idle period (IPIP) is at least Texp. Note that, if IPIP=(1/30)s, a fixed transmit signal format works for all Texp≤(1/30)s. This may be used to provide a universal signal format.

If the packet length is between 12 and 17 bits long, it turns out that the minimum eye height of the eye pattern is determined by only a few "detrimental" bit patterns that have a poor spectral representation that can be destroyed by the "Texp moving average filter" in such a manner that it is irrecoverable. If those detrimental bit patterns are only a few, one can avoid those from occurring by so-called "guided scrambling". However, it turns out that one requires in the order of 16 different scrambling patterns for applying a useful guided scrambling. Since the index of the scrambling pattern also has to be encoded in each packet, the number of useful bits would again be reduced to 8 or 9 per packet. So for very short repeated messages, the un-scrambled short packets may be deemed to be most useful. For longer messages, guided scrambling may be very useful.

Messages Constructed from Multiple Packets

For transmitting a useful amount of information from a light source to a camera receiver, messages are constructed which consist of a concatenation of p packets, where each packet has its own bit content. Between each two packets, there is at least an inter-packet idle period (IPIP) to prevent ISI crosstalk between different packets. At the end of a message, there is an extra inter-message idle period (IMIP). A message consisting of p packets is cyclically repeated.

In a preferred embodiment, p=3, so effectively 3 bytes of information (24 bits) are transmitted per message.

Inter-Packet Idle Period

The purpose of the inter-packet idle period (IPIP) is to limit the ISI induced by the exposure time (Texp) of the camera to a single packet. In a preferred embodiment, the duration of the IPIP shall be equal to the maximum expected exposure time, Texp_max. This may provide a universal IPIP format, since it allows recovery of the messages for any Texp if: Texp≤IPIP=Texp_max.

The inventors have also found that messages are recoverable if Texp>IPIP, for carefully chosen TM-symbol rates, where the carefully chosen TM-symbol rates then depend on the actual Texp used by the camera. Formats exploiting the enhanced signaling speed for this case will belong to the "negotiated signal formats", since the transmitting light source and the camera receiver should agree on the choice of transmit parameters such as TM-symbol rate, number of packets per message, IPIP and/or IMIP, to ensure that the actual coded light transmissions can be received. The choice of these parameters depends on the available camera settings of, e.g., Texp, frame rate, line rate and the footprint of the light source.

Note, while embodiments herein are described in terms of an IPIP following each packet and an extra IMIP being tagged on the end of the last IPIP, in an alternative description or implementation an IPIP may be included only between adjacent packets of the same message, with the total idle period following the end of the last message being the IMIP.

Inter-Message Idle Period

The inter-message idle period (IMIP) is an idle period that is appended after the last IPIP which trails the last packet of a message. The IMIP may be measured in TM symbols.

The IMIP serves two goals:
(i) to make sure that the total message duration is such that it satisfies nice "rolling properties" given the frame rate, i.e. such that footprints of consecutive frames reveal the complete message as fast as possible; and/or
(ii) the second purpose of the IMIP is to provide an asymmetry in the pattern of packets and idle periods within the cyclic repetition of messages. This property can be used in the cyclic synchronization of a receiver.

Synchronization Elements of Format

For synchronization purposes, two elements of the signal format are significant.
(i) The usage of the first bit of each 9-bit packet as a synchronization bit. In a preferred embodiment, the first bit of the first packet of a message shall be one, while the first bit of all remaining packets shall be zero.
(ii) The usage of the inter-message idle period (IMIP). The presence of a non-zero IMIP breaks the regular temporal packet structure in a repeated message, because the total idle time after the last packet of a message is longer than the idle times between the other packets.

In a preferred embodiment, the IMIP shall have a duration of at least 4 symbols.

Example Parameters

Given all of the above considerations, some example parameter choices are:
fsymbol≥1 kHz (flicker and strobo),
envisioned packet durations:
around 52 ms (≥49 ms) for fsymbol~1 kHz
around 26 ms (≥24.5 ms) for fsymbol~2 kHz
around 13 ms (≥12.25 ms) for fsymbol~4 kHz,
message durations Tm are an integer multiple of packet durations, and/or
interesting message durations: around 26, 52, 104 ms.
For instance:
the exposure time is less than or equal to (1/30)s, the symbol rate is 1 kHz and the packet is 52 ms including inter-packet idle period;
the exposure time is less than or equal to (1/60)s, the symbol rate is 2 kHz and the packet is 26 ms including inter-packet idle period; or
the exposure time is less than or equal to (1/120)s, the symbol rate is 4 kHz and the packet is 13 ms including any inter-packet idle period.

Other example parameter choices:

3-packets format (with CRC) having a duration of 158 ms @ 1 kHz symbol rate, with the 158 ms corresponding to a 3-byte message having an IPIP of 33 symbols and an IMIP of 2 symbols; or a packet length of 70 symbols~35 ms @ 2 kHz, with the 35 ms corresponding to a 3-byte message having an IPIP of 3 symbols and an IMIP of 4 symbols (e.g. this format can be used where T_exp is controlled to be less than (1/500)s).

In a negotiated format case, the controller may be arranged to select between a list of multiple combinations of parameters, comprising any of one or more these combinations, and/or other combinations. In a universal format, one particular combination is pre-chosen to satisfy as many cameras (or rather exposure times) as possible.

Cyclic Redundancy Check (CRC)

In a preferred embodiment, a message consists of several packets, where each packet contains 1 byte of information. In case a CRC is used, it is suggested that the last byte of each message is an 8-bit CRC. Because of the repeated decoding results delivered by a receiver decoding the cyclically repeated signal format, one can obtain potentially many realizations of the transmitted message, which allow the reliability of a received message to be enhanced by comparing the decoding results of consecutive decoded variants of the same message.

In a preferred embodiment, the CRC is characterized by a pre-load and parity inversion. The pre-load can be application-specific, thus allowing a receiver to distinguish between messages from different applications in use in the same environment. Note that there is a trade-off between the number of different pre-loads in use, and the effective error-detection capability of the CRC.

Multiple Messages

The inventors have found that one can transmit a concatenation of different messages $m_i$, where each message $m_i$ is repeated N times, where N is a sufficient number of times such that a camera receiver can reconstruct reliably a complete message $m_i$ given the footprint of the transmitting light source. After N repetitions of the same message $m_i$, the light source can transmit a completely different message $m_{i+1}$ having the same signal parameters, by just concatenating, say N, repetitions of message $m_{i+1}$. right after $m_i$. It turns out that a receiver is capable of recognizing a coherently reconstructed message by observing the CRC.

Message Reassembly

The following describes a process of reassembling or "stitching" of video frames for coded light message recovery by a camera. The receiver receives a signal formatted as described above and re-assembles the parts of the message into a complete message, which is then provided for further processing.

In embodiments the reassembly process comprises the following.

(i) For each of multiple frames, establish a sample per image line as described above (see again the samples 19 taken from lines 18 in FIG. 2).

(ii) Collect all the (active) samples of a given frame into a time-sequence (each positioned at the respective time at which the sample from that line was located within the frame). This sequence forms a "marginal signal" or "frame signal" for each frame.

(iii) Next extend the signals with zeros resulting in an "extended marginal signal" or "extended frame signal", where the duration of each extended signal is n times the message duration (n being an integer) and where the duration is longer than the frame duration.

(iv) Next the active samples are time-aligned, i.e. shift the samples per line by Tframe to the right within the time frame or scale defined by the extended signal. This is done cyclically, i.e. in a wrap-around fashion wrapping around beyond the end of the extended frame signal length. This way the shifted position of the samples within the extended framework is such that it facilitates reassembly.

(v) Next the samples are collapsed (i.e. reassembled). In embodiments different reconstructions can be found by shifting one measurement further.

Once reconstructed the signal can be filtered to eliminate inter-symbol interference (ISI), e.g. using a Wiener filter.

In embodiments, the ISI filter is robust enough to handle gaps in the reassembled data (this robustness being at least in part a result of the modulation code, message format and the Wiener filter). The process may also allow elegant handling of skipped frames.

In further embodiments, as an additional feature, the process may also allow the receiver to correct for clock deviations relative to the timing of Tm or Tframe based on correlation of reconstructed signals.

An example of the message reassembly process will be discussed in more detail shortly, but first some example details of the receiver front end are elaborated upon with reference to FIGS. 1 to 4.

In embodiments, the camera-based, digitally-coded light receiver disclosed herein is very different from the class of well-known receivers of digital signals using radio or IR communication. Both the general structure of the coded light receiver, as well as the detailed algorithms for performing the sub-tasks within a coded light receiver, are quite distinct.

The input of a camera-based coded light receiver consists of a movie taken in a known format. For instance, a well-known video format is 480p, a progressive scan format having frames taken at 29.97 frames per second (fps), where each frame consists of 480 lines and each line contains 640 pixels. The coded light receiver consists of the digital signal processing applied to this movie for obtaining the digital content of the modulated light source.

The signal processing performed by the receiver may comprise 2D signal processing and 1D signal processing. The 2D signal processing may comprise:

(i) selection of an appropriate color (R, G or B) or a linear combination of colors for extracting the coded light signal;

(ii) image segmentation using a blob approach, efficiently identifying regions in the image containing coded light sources;

(iii) identifying spatial filter "active pixels" within each blob;

(iv) efficient motion compensation (independently for each source) using marginal; and/or (v) computing signal "marginal" by combining of active pixels per line (computing samples 19 resulting from each line 18 in FIG. 2).

The 1D signal processing may comprise:

(i) using correlations within a frame for estimating the transmit clock (works best for footprint>>duration of message);

(ii) assuming the use of the above-described signal format, where a message is cyclically repeated by the transmitter, and exploiting the knowledge of the repetition time of the message (Tm) and the knowledge of the number of frames per second (Tframe) for reconstructing a complete message from the partial snapshots obtained in each frame (this is the reassembly process to be described in more detail shortly);

(iii) using correlations between successive reconstructed signals for estimating the transmit clock;

(iv) using robust Wiener filtering on a single period of the message for mitigating the ISI caused by Texp;
(v) applying robust Wiener interpolation if the reassembly procedure has left holes in the reconstruction;
(vi) finding global circular synchronization by processing using a sync template; (vii) decoding the bits by making decisions on the optimum sampling points given by the global circular synchronization; and/or
(viii) checking CRC on consecutive reconstructed messages. If m out of n consecutive reconstructions have CRC=OK, accept the message.

For a particular message format and a given footprint, it may take for example 30 consecutive frames for reassembling a complete message. If one has a recording of 2 seconds (say, 60 frames), the receiver can generate 31 different realizations of the same message. In embodiments, by comparing theses different decoding results it is possible to aid synchronization of the receiver clock with the received signal.

Regarding the selection of appropriate color, it turns out that the section of the appropriate color can be significant for recovering the coded light signal. For instance, the color Green (G) is characterized by the highest pixel density in the camera, thus giving the highest spatial (and thus temporal) resolution of a coded light signal. This may be of importance if the coded light is using a high symbol frequency (wide bandwidth). On the other hand, it turns out that the color blue (B) is favorable if a light source has a high intensity and if Texp is rather long, since this color tends to lead to less clipping of the pixels.

Figure 4:
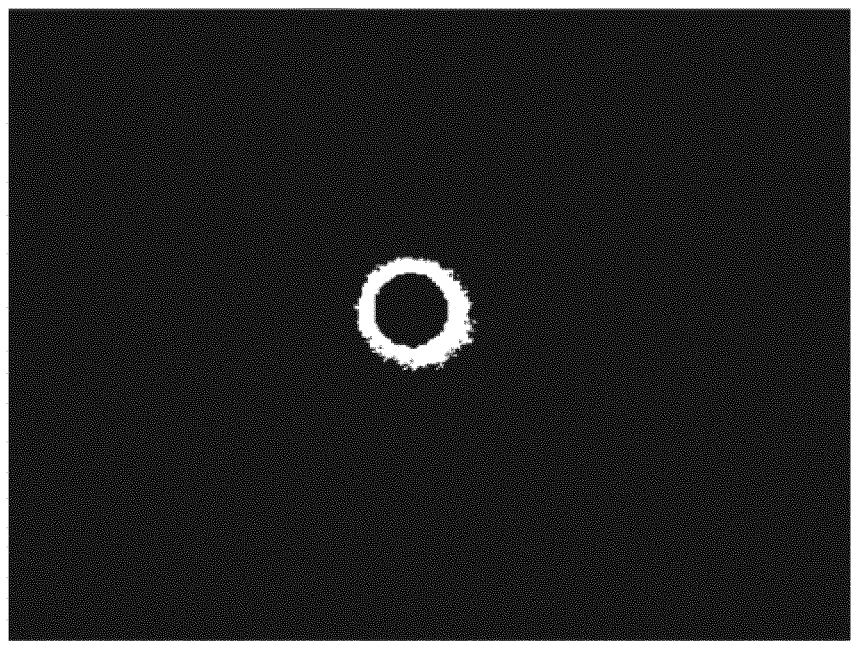
FIG. 4 shows an example of usable samples obtained from a captured frame, FIG. 5 schematically illustrates a Ternary Manchester coding scheme, FIG. 6 schematically illustrates an example signal coded using Ternary Manchester, FIG. 7 schematically illustrates a message format.

Referring to FIGS. 2 to 4, for image segmentation, embodiments of the present disclosure use a "blob"-approach for recognizing regions in an image that can be associated with a lamp possibly transmitting coded light information. Typically, a blob is a region of high intensity in an image (e.g. see FIG. 3). An algorithm can recognize and differentiate different blobs in an image. For example using edges of the blobs allows for efficiently tracking a blob and limiting the 2D signal processing associated with each blob in the different frames of the video sequence.

To find contributing pixels within a blob, only those pixels that are modulated, i.e., have sufficient intensity variations due to the modulated light source, contribute effectively to the signal. Other source pixels effectively only produce "noise" or other unwanted side effects. Typically, pixels that are clipped are also removed from further consideration (e.g. see FIG. 4). Also pixels having insufficient intensity are removed. The resulting set of "contributing pixels" belonging to a light source can be represented as a binary spatial 2D filter.

The following describes of an algorithm that operates on the samples that are obtained as the "marginals" in each frame (the samples 19 in FIG. 2, i.e. the "line-combined" samples).

FIG. 3 depicts a receiver-generated binary picture that indicates the source of interest. FIG. 4 shows, in binary, the contributing pixels of the selected source in each frame. Note that the pixels in the center part of the source do not contribute, because those pixels are over-exposed, i.e. clipped.

Figure 13:
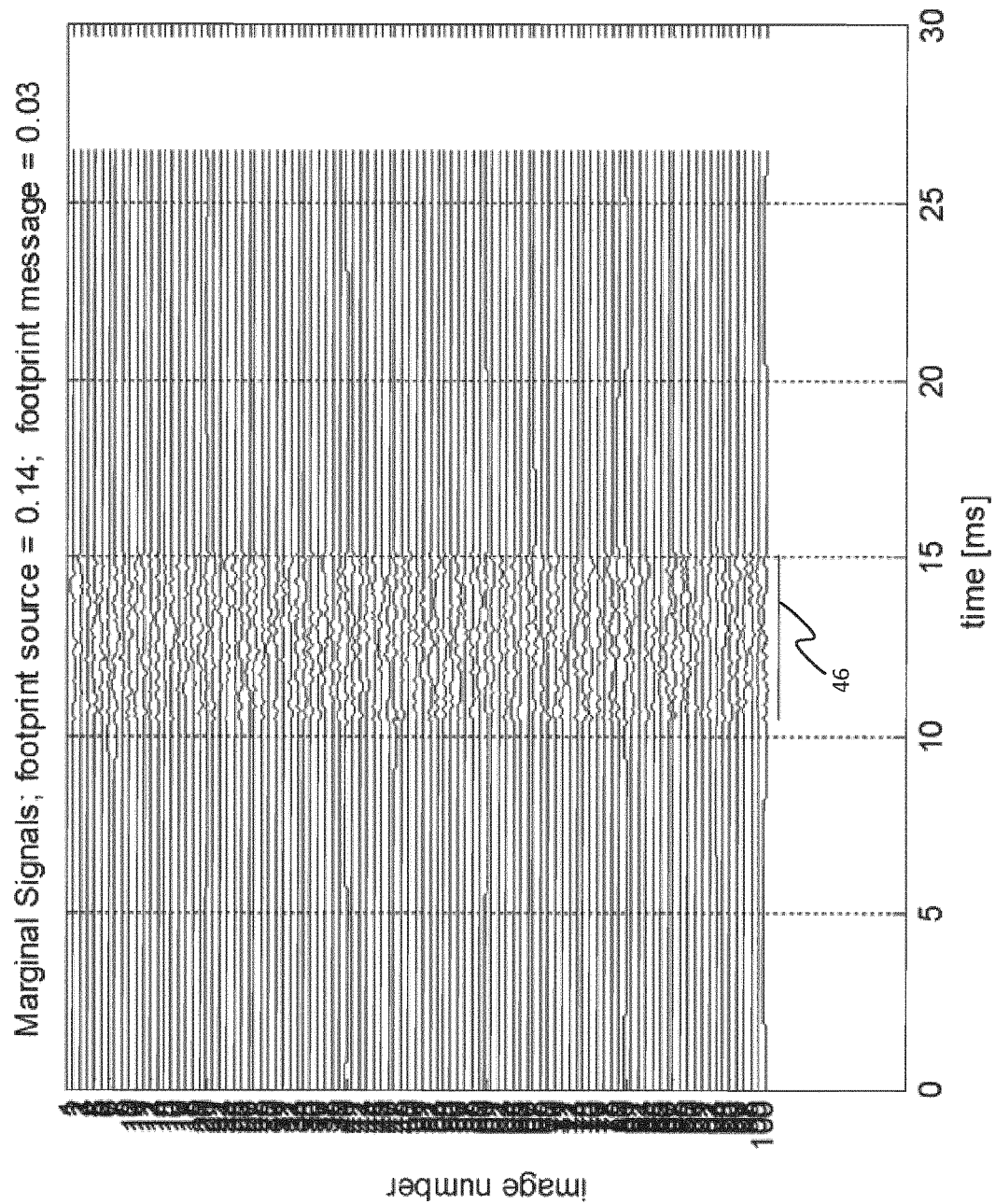
FIG. 13 shows signals obtained by sampling each of a plurality of frames.

FIG. 13 shows the "marginal signals" (made up of the samples 19 from FIG. 2) of each of the 100 consecutive frames shot in the movie, each sample obtained by a proper operation of the active pixels of its corresponding line. I.e. each "marginal signal" is the signal obtained from one given frame 16, with the samples 19 taken from each active line 18 of that frame being positioned in time at the respective times within the frame duration at which they were sampled. Note that in FIG. 2 the time axis corresponding to consecutive samples of a single frame runs from top to bottom, while in FIG. 13, the time axis of consecutive samples in a single frame runs from left to right (with the page in landscape). In FIG. 13, the 100 consecutive video frames (each frame generating a single 1-dimensional signal) are stacked on top of each other, consecutive frames going from top to bottom.

Note also that, although Tframe equals about 1/30~33 ms, the marginal signal of a single frame has a duration of only about 26.5 ms due to the hidden lines 26. At the bottom of FIG. 13 is shown a bar 46 that indicates the samples that originate from the lines that cover the light source in each frame, i.e. only this part of each row contains samples that originate from the source. For this example, it turns out that the footprint of the source with respect to a frame, FSF~0.14, i.e. only about 14% of the lines per frame actually contain pixels of the source.

Figure 14:
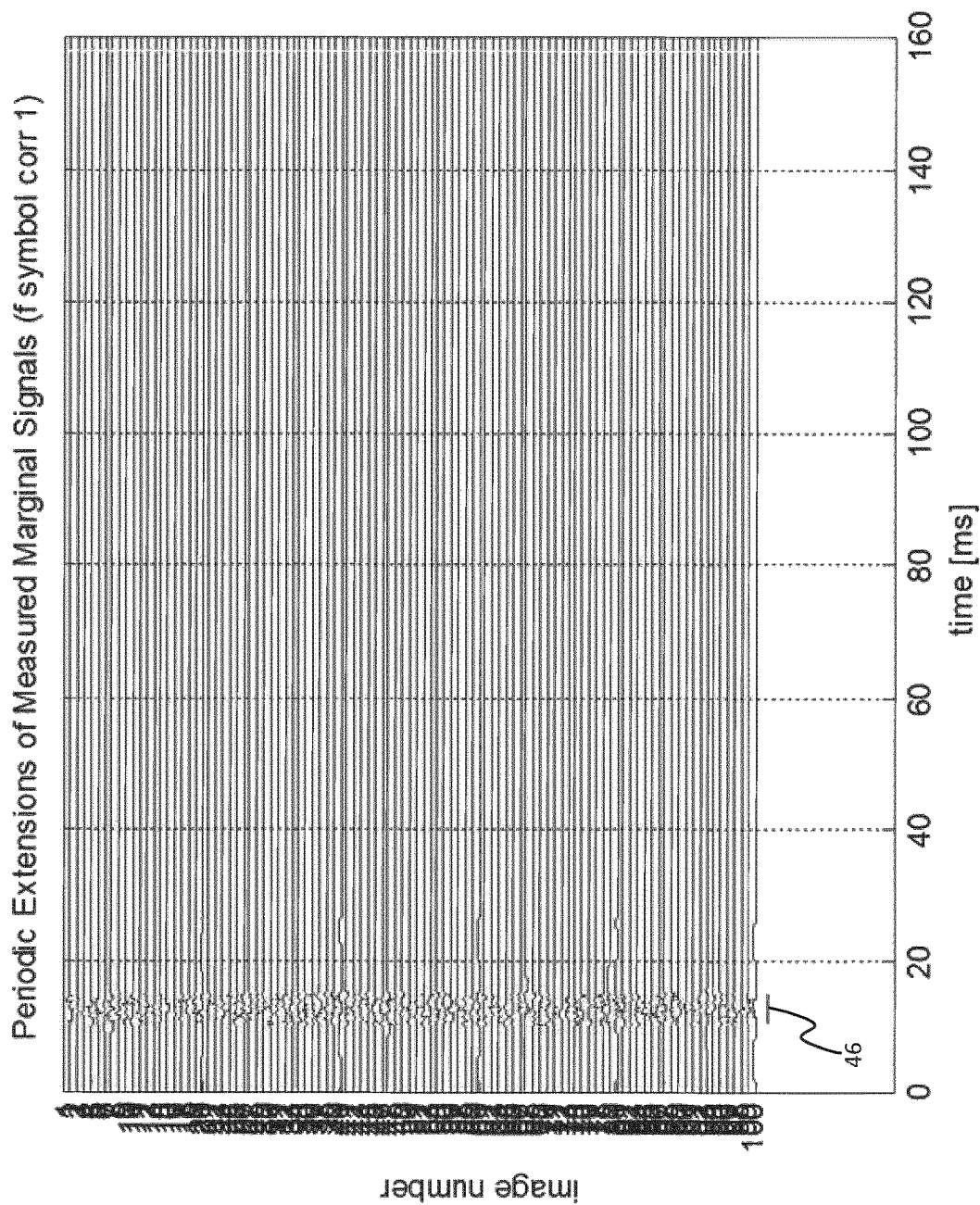
FIG. 14 shows extended versions of the signals obtained from sampling frames.

In FIG. 14 it is shown how to use the known durations Tm and Tframe to generate "extended marginal signals" or "extended frame signals", each being an extended version of the signal sampled from a respective frame. This is done as follows.

(i) Define for each frame a stretch, i.e. a temporal region around (e.g. extending after) the active samples of FIG. 13, such that a stretch duration of m times Tm is obtained, where m is a conveniently chosen integer. Note that zeros can always be added or removed outside the active samples.

(ii) Compute num_periods=ceiling(Tframe/(m*Tm)), where "ceiling" means round up to the nearest integer.

(iii) Cyclically repeat each stretch num_periods times such that an "extended marginal signal" is obtained for each frame having a total duration of at least Tframe. Note that the extended marginal signal always has a duration that is larger than Tframe, and that it is an integer multiple of Tm.

In the example, Tm=158 ms; Tframe=33.36, so m=1 and num_periods=1, and each frame is extended by zeros to obtain a stretch of 158 ms (=1 period of the message). Note that the actual useful observation in each frame (stretch) is only a fraction of about 0.03 of a complete message, indicated by the bar 48 in FIG. 14. One may say that the footprint of the source with respect to a message, FSM, ~0.03.

Note that in embodiments it is not necessary to use two separate integers m and num_periods. The point is to determine a time period that is an integer multiple of the message length (duration) Tm, and which is longer than the frame length (duration) Tframe. This period defines a reference time scale or reference frame within which the signals obtained from the different frames can be aligned, as now disused.

The time-alignment of the observations originating from the different frames is performed using Tframe and the now-defined reference framework or scale determined as explained above. The "extended marginal signal" of each line is shifted Tframe to the right (in the positive time direction) with respect the extended marginal signal of its previous frame. However, as the extended marginal signals were made a multiple of the message duration Tm, and because the transmitted message is repeated cyclically, one can replace the shift of each extended marginal signal by a cyclic (wrap around) shift, thus obtaining the results in FIG. 15.

That is, as mentioned, the "extending" discussed above provides a timing reference period, which defines scale or framework within which to position the signals obtained from each frame. This reference period has a length being an integer multiple of the message duration Tm. Furthermore, the scale or framework it defines wraps around. I.e. beyond the end of the timing reference period, the scale or framework wraps back around to the beginning of the reference period. Hence if in shifting the signal from a given frame right by Tframe relative to its preceding frame causes a portion of that frame's signal to shift "off the end" or "off the right hand side" of the reference scale or frame (beyond the timing reference period, i.e. beyond the integer multiple of Tm that has been defined for this purpose), then the portion of that signal continues by reappearing at the beginning of the reference scale or frame (starting from time zero relative to the timing reference period).

Note that in embodiments, it need not be necessary to "extend" the signals from each frame (the "marginal signals") by adding zeros. This is just one way of implementing the idea of creating a wrap-around reference frame that is an integer multiple of the message duration Tm. An equivalent way to implement or consider this would be that this timing reference period (that is an integer multiple of Tm) defines a "canvas" on which to place the signals from each frame, and on which to shift them by their respective multiples of Tframe in a wrap-around manner.

Note also that in all cyclically-shifted, extended marginal signals, the receiver keeps track of the locations of the active samples originating from the coded light source.

Figure 15:
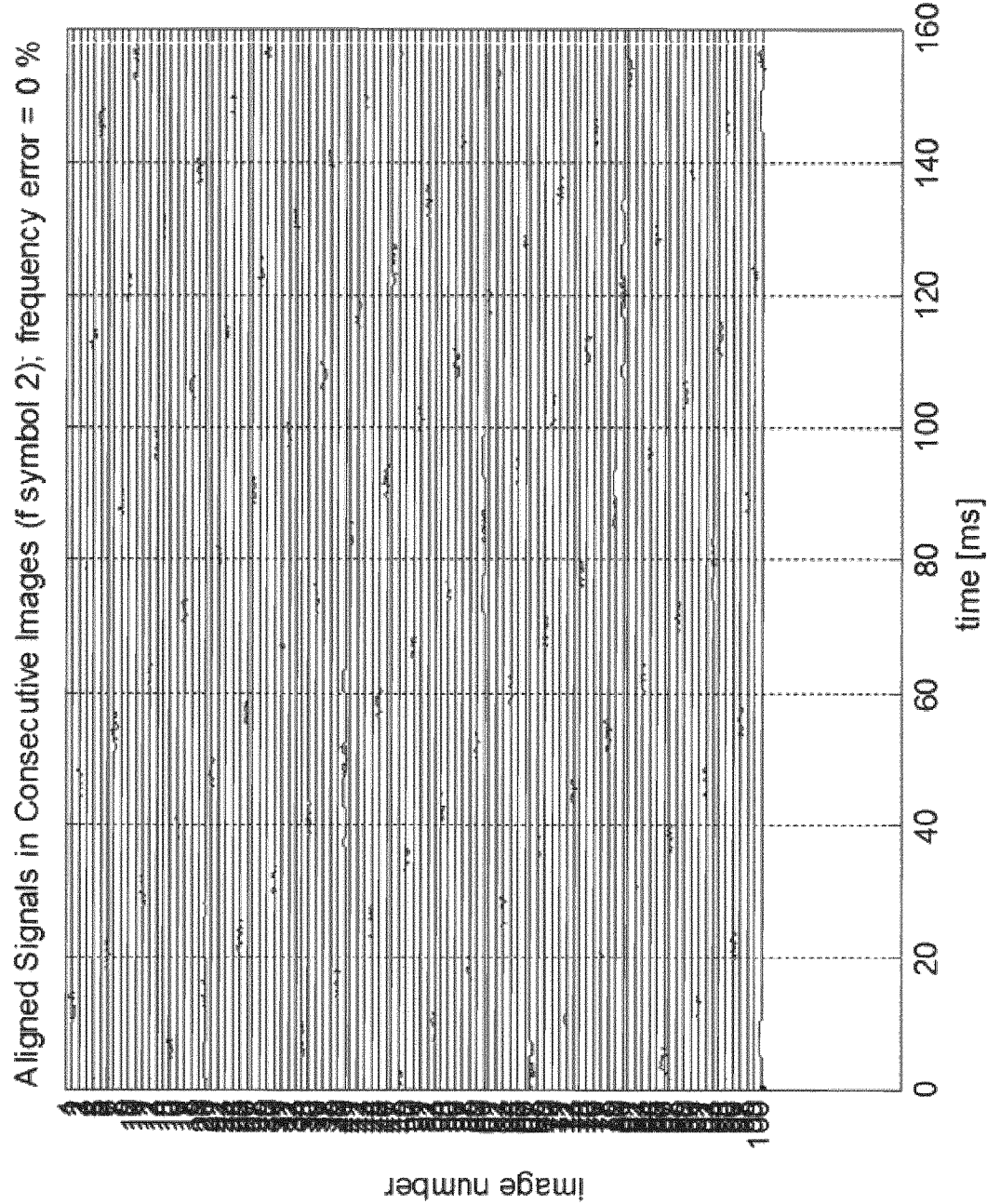
FIG. 15 shows time aligned versions of the signals from a plurality of frames.

Having results as in FIG. 15, the receiver can now, for each time sample of the message, look in the vertical direction for frames that have a valid contributing sample at that position.

From the FSM being about 0.03, one can expect that it takes at least (0.03)−1~33 frames for recovering a complete message. Typically, because of overlap, in embodiments the receiver may need about twice that many frames for complete recovery.

Figure 16:
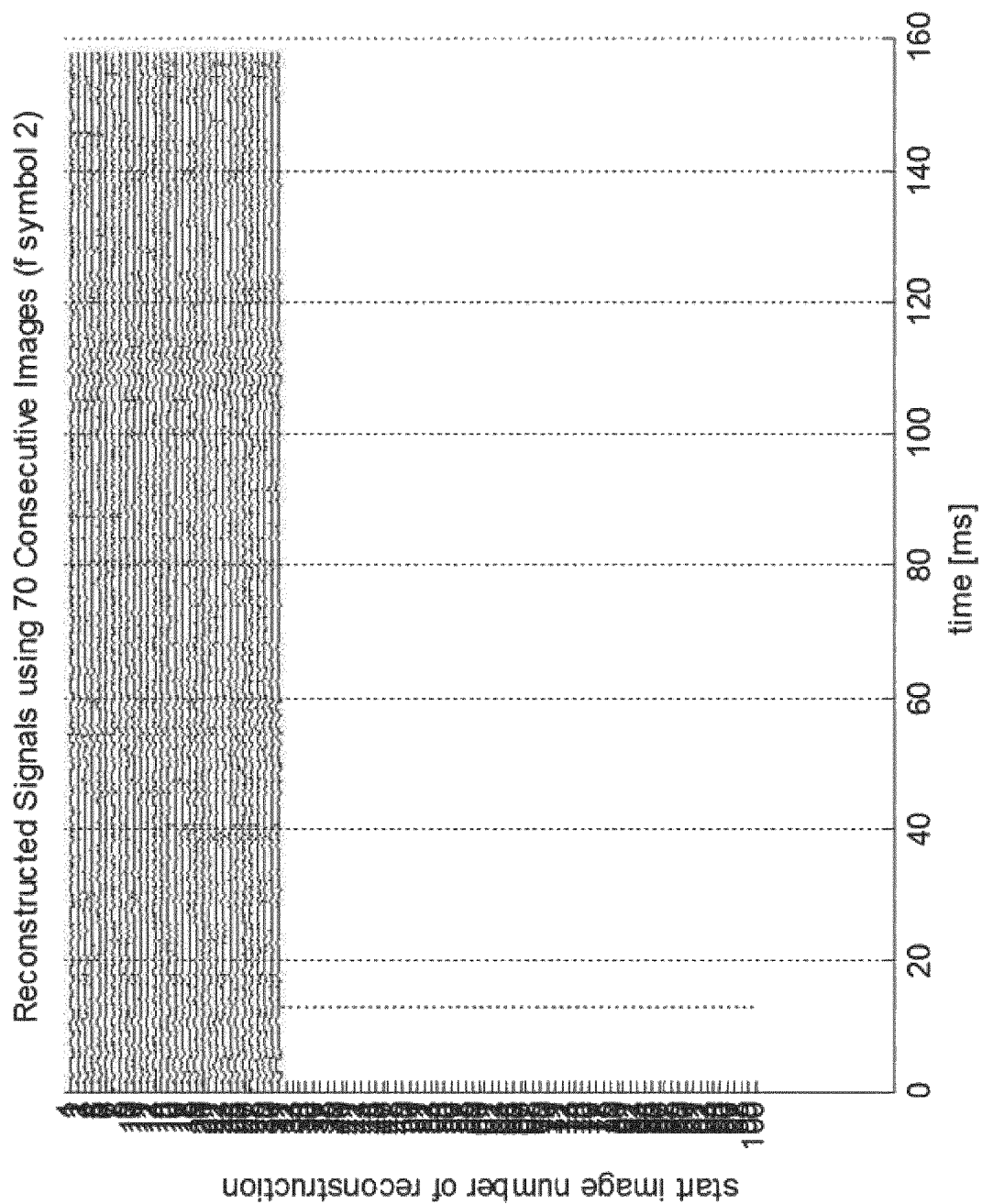
FIG. 16 shows signals reconstructed from a plurality of frames.

From FIG. 16, it can be seen that the decoder, in the example, needs 70 consecutive frames for a reconstruction of a complete message (a movie of ~2 seconds). Since each 70 consecutive frames give a reconstruction, a video of 100 frames gives 31 different reconstructions (albeit they are dependent).

Figure 17:
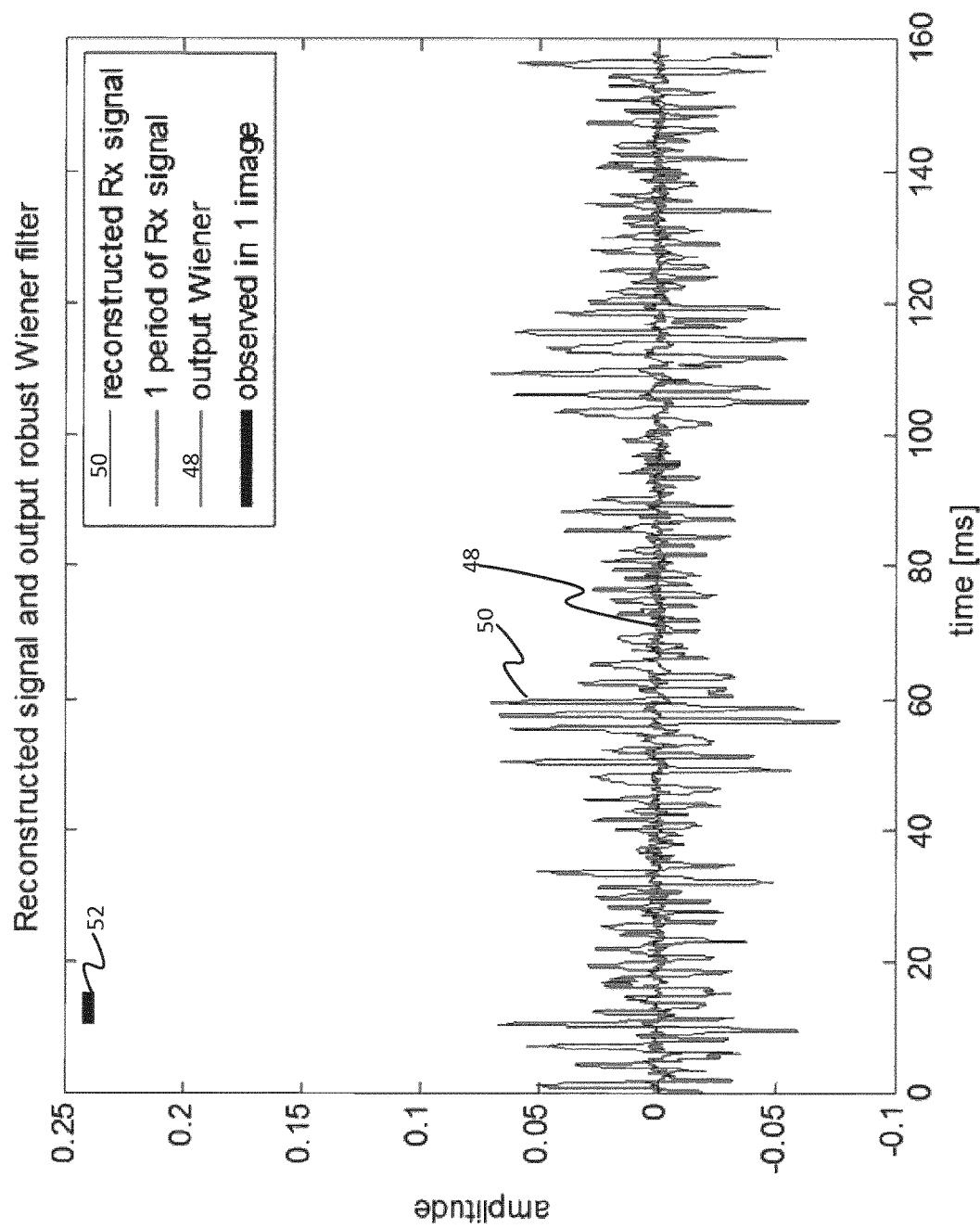
FIG. 17 shows a reconstructed message.

FIG. 17 shows the result of the reconstruction 48 (and output of the robust Wiener equalization 50) of the first reconstructed message. The length of the bold bar 52 at the top of the figure indicates which fraction (~3%, ~5 ms) of the complete message is obtained from a single frame in this example.

In further embodiments, the procedure described above also can deal with so-called "skipped frames". The assumption is that a possibly skipped frame is detected by observing the frame recording times that are given by the camera. If a frame is skipped, the corresponding marginal signal will obtain no valid support in FIGS. 16 and 17. Therefore the reassembly algorithm will automatically discard the corresponding frame.

In yet further embodiments, by observing the correlations between different reconstructed signals (31 of them in FIG. 17), one can correct for clock deviations between transmitter and receiver. If all clocks are in perfect synchronism (assuming perfect knowledge of Tm and Tframe), these different reconstructed signals will be perfectly aligned vertically (modulo different noise effects). A clock deviation will show up as a non-zero shift of the best correlation. In this manner, the receiver can adapt to the transmitter clock. It turns out that this method works, even if the received signal is heavily corrupted by the ISI caused by the exposure time of the camera.

The minimum number of frames required in order to get a complete reassembly is now discussed.

Consider again what happens to covering a message with footprints if:

relative footprint $\alpha = \text{Tfootprint}/\text{Tf}=0.4$ $0<\alpha\leq 1$, (in practice e.g. $0<\alpha\leq 0.88$ due to hidden lines)

Figure 18:
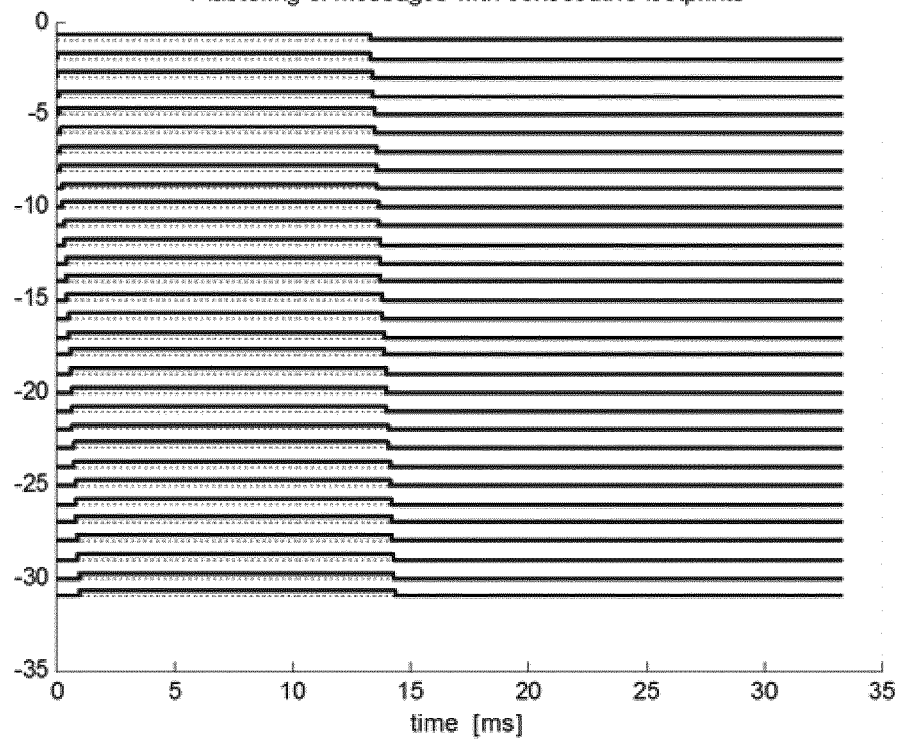
FIG. 18 shows a non-rolling alignment of messages.

If Tm is about Tframe, the alignment of the messages looks like FIG. 18.

Figure 19:
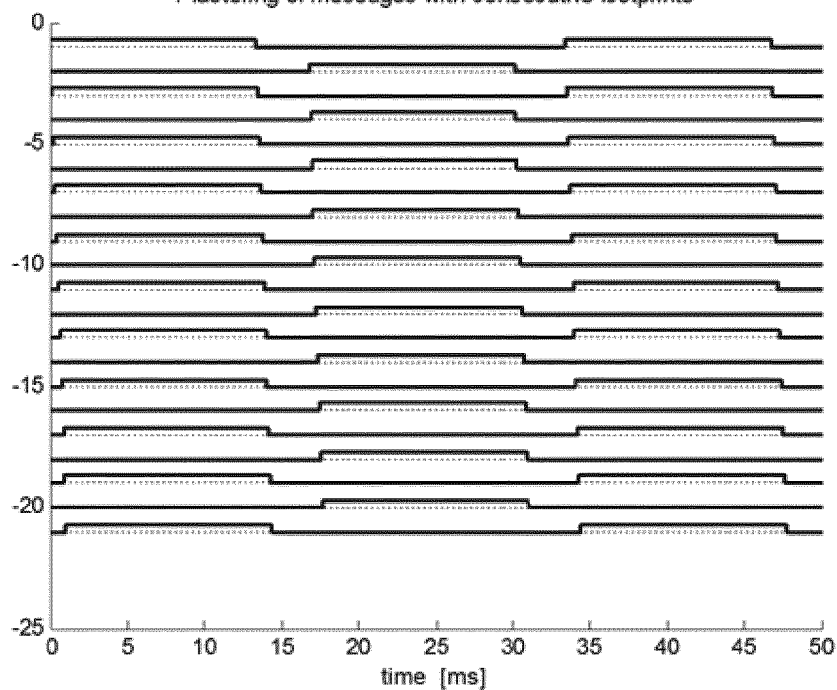
FIG. 19 shows a "switching" alignment of messages.

If Tm is about 1.5 times Tframe, the alignment of the messages looks like FIG. 19.

It turns out that, if $\alpha<1$, one obtains "non-rolling" footprints if the message durations Tm are a multiple of the frame duration Tf. If $\alpha<0.5$, one obtains "switching" footprints if Tm is a half-integer multiple of Tf (0.5, 1.5, 2.5, . . . ).

As discussed previously in relation to FIG. 8, in general, if $1/(n+1)<\alpha\leq 1/n$, where n is integer, then one has non-rolling message durations Tm if:

$$\frac{T_m}{T_f} \in \left\{ \frac{k}{m} \mid m = 1, \ldots, n, k \in N^+ \right\}$$

Note that the singularities for small m are wider than for larger m.

For a non-rolling message duration $T_m = T_0$, define $m_0$, the smallest m such that $m_0 \cdot T_0 = k_0 \cdot \text{Tframe}$, as the order of the non-rolling $T_0$. $\text{GCD}(m_0, k_0) = 1$.

The numbers $m_0$ and $k_0$ determine the repeat pattern of footprints and messages in the neighborhood of $T_0$: about $k_0$ non-rolling footprints go into $m_0$ messages.

Consider a message of duration $T_m \sim T_0$ in the neighborhood of a non-rolling message duration $T_0$: after 1 round of $m_0$ messages, there are $k_0$ disjoint equidistant footprints partly covering the message.

The non-covered part is: $T_0 - k_0 \cdot \alpha \cdot \text{Tframe}$, divided into $k_0$ equal parts of size Tg, where $$Tg = (T_0 - k_0 \cdot \text{Tframe} \cdot \alpha)/k_0 = (T_0 - m_0 \cdot T_0 \cdot \alpha)/k_0 = T_0(1 - m_0 \cdot \alpha)/k_0$$

FIG. 18 shows the time-alignment of messages with consecutive footprints where $\alpha=0.4$; close to $m_0=1$, $k_0=1$. Here the message does not roll significantly and each frame sees almost the same part of the message (rolling only very slowly).

FIG. 19 shows the time-alignment of messages with consecutive footprints in another case where $\alpha=0.4$; close to $m_0=2$, $k_0=3$. Here one sees "switching". After 1 round of $m_0$ messages, there are $k_0$ gaps each of duration Tg that have to be covered by the incremental shifts of the footprints in the next rounds.

Considering the shift $\Delta T$ of footprints from one to the next round:

$$\Delta T = m_0 \cdot |Tm - T0| \, [\text{ms}]$$

one needs $\sim 1 + Tg/\Delta T$ rounds to cover the complete message $1 + Tg/\Delta T$ rounds correspond to $Nf = (1 + Tg/\Delta T) \cdot k_0$ frames $$N_f \approx \left(1 + \frac{T_g}{\Delta T}\right) \cdot k_0 = k_0 + \frac{T_0(1 - m_0 \cdot \alpha)}{|m_0 T_m - m_0 T_0|} = k_0 + \frac{T_0(1 - m_0 \cdot \alpha)}{m_0 |T_m - T_0|},$$

$$m_0 \leq n$$

Note the hyperbolic behavior of Nf for Tm in neighborhood of $T_0$. Note also the effect of $m_0$ and $T_0$ on the "width" of a singularity.

Robust Wiener Filtering

This following describes another part of the decoder which in embodiments allows the above implementation to have a considerably better performance and allows the device to be used with a much wider range of cameras.

A robust Wiener filter is introduced, that can be used, e.g. for equalizing a signal that is corrupted by a filter H(f) having unknown parameters, and by additive noise. The robust Wiener is a constant filter that produces optimum results in an MSE sense, assuming that the probability distribution of the filter parameters is known.

Wiener filter theory in itself is well-known in digital signal processing, and has been used extensively since the second world war. Wiener filters can, for instance, be used for estimation of a (linearly) distorted signal in the presence of noise. A Wiener filter (equalizer) then gives the best (mean square error, MSE) result.

Figure 20:
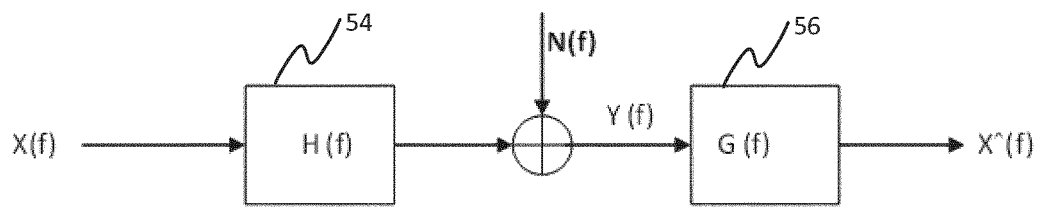
FIG. 20 is a schematic block diagram of a Wiener filter equalizing a filter H.

In classical (frequency-domain) Wiener filtering, e.g. deconvolution, one has two independent, stationary, zero mean random processes X and No as shown in FIG. 20.

In a typical application, X represents an input signal input to a filter H (numeral 54 in FIG. 20), and No represents additive noise added at the output of the filter H. The Wiener filter G (numeral 56) is arranged to equalize the filter H, i.e. to undo the effect of the filter H on the input signal X in presence of the noise N (to a best approximation).

A typical application is the detection of coded light with a rolling shutter camera. In this case, the equivalent digital signal processing problem corresponds to the restoration of a digital signal that has been filtered by a temporal box function. See FIG. 21. That is, the input signal X represents the coded light signal as captured by the rolling shutter camera, and the filter H represents the filtering effect of the rolling shutter acquisition process. This filter H is created by the exposure of each line. It amounts to a box function (i.e. rectangular function) in the time domain with a width Texp—i.e. a line is exposed for a time Texp in which time it captures the signal (the transfer function of the filter H in the time domain is uniformly "on"), and before and after that it does not capture any signal (the transfer function of H in the time domain is zero). A box function in the time domain corresponds to a sinc function in the frequency domain. An effect of this filter can be to produce inter-symbol interference. Hence in the following, the filter created by Texp may be referred to in terms of its unwanted effect, as an "ISI filter".

Figure 21:
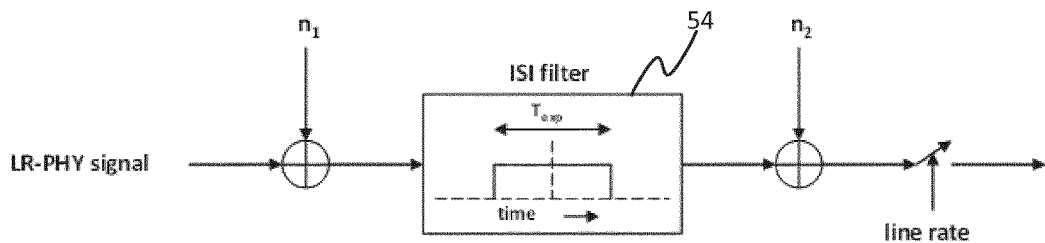
FIG. 21 is a schematic block diagram of an ISI filter resulting from a rolling shutter.
Figure 22:
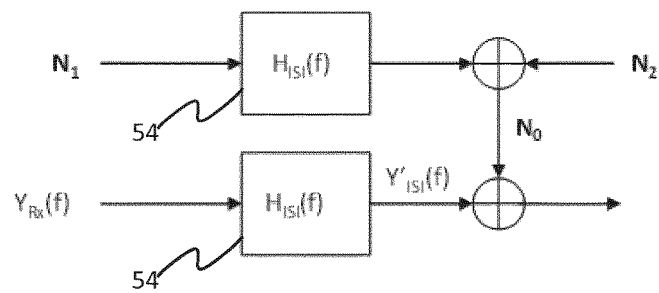
FIG. 22 is a schematic block diagram representing additive noise.

(FIGS. 21 and 22 also show how the noise No may be considered as the sum of: (i) a noise term n1 at the input of the filter H passed through the filter H, and (i) a noise term n2 at the output of the filter H.)

The task is to find a linear filter G which provides a minimum mean square error estimate of X using only Y. To do this the Wiener filter G is preconfigured based on assumed knowledge of the filter H to be equalized (i.e. undone), as well as No. It is configured analytically such that (in theory given knowledge of H and the spectrum of X and N), applying the Wiener filter G to Y (where Y is the input signal X plus the noise N) will result in an output signal X^ that minimizes the mean square error (MSE) with respect to the original input signal X.

The classical Wiener filter formulation (in the frequency domain) is:

$$G(f) = \frac{H^*(f)S(f)}{|H(f)|^2 S(f) + N(f)}$$

where S(f) is the spectral density of the input signal X and N(f) is the spectral density of the noise term $N_0$.

As can be seen, the formulation of a Wiener filter comprises a representation of the filter to be equalized, in this case in the form of $H^*$ and $|H|^2$ (=HH*). Traditionally in the classical Wiener filter, it is assumed that H(f), the filter to be equalized, and N(f), the noise spectral density, are exactly known. In the case of equalizing for the ISI filter created by a rolling shutter acquisition process, this implies exact knowledge of Texp. It is also assumed that the spectral densities S(f) and $N_0$(f) of the processes X and N, respectively, are known.

However, Wiener filters are in fact very sensitive to errors in the estimation of H(f). Some techniques have been developed in the past to deal with an unknown distortion, such as iterative (time-consuming) approaches, where one tries to vary the target response until one gets the best result; or min-max approaches, where one tries to identify the worst case H(f) and optimizes the Wiener filter for this.

A problem therefore in using classical Wiener filtering for equalization, is in applying this theory if the gain of the filter has to be large and the filter to be equalized is not known very accurately.

E.g. for a bandwidth of the signal is in the order of 1 kHz with Texp in the range of 1/30 of a second, the ISI filter can introduce severe inter-symbol interference (ISI) like shown in FIGS. 11 and 12.

In order to undo this ISI at the receiver side, it would be desirable to provide a "powerful" equalizer filter that is insensitive to inaccuracies in the definition of H(f).

According to the present disclosure, this can be achieved by computing a fixed "average Wiener filter", a Wiener-like filter that is robust under unknown variations of the ISI filter H(f). This "robust Wiener filter" can produces a more optimal output in terms of MSE, given a statistical distribution of the relevant parameters of H(f).

In an application to coded light, this theory allows one to reconstruct a coded light signal where Texp of the camera is only known approximately, which can often be the case.

The inventors have found a particularly efficient derivation of an optimal robust Wiener filter. In the following the problem is described in the frequency domain (so in terms of H(f), as introduced before). Note that in an application to coded light, the robust Wiener filter may be constructed in real time in a camera-based (smart phone) decoding algorithm, as Texp, and therefore H(f), is defined or changed during the actual read-out of a lamp.

The robust Wiener filtering is based on noting that H(f) is not known exactly, but may in fact be dependent on at least one unknown quantity θ, i.e. a parameter of H whose value is not known and may in fact in any given case be found within a range of values, e.g. between two limits −Δ and +Δ (or more generally Δ1 and Δ2). That is, it is assumed that the filter H(f;θ) depends on a random parameter θ, independent of X and N.

For a box function of width θ, i.e. a sinc in the frequency domain, one may write:

$$H(f;\theta) = \frac{\sin(\pi\theta f)}{\pi\theta f}$$

And in the case of an ISI filter created by the box, θ is Texp.

The robust Wiener filter 56' is then created by taking the classical Wiener filter representation given above, and where a representation of the filter to be equalized appears, replacing with a corresponding averaged representation that is averaged over the potential values of the unknown parameter θ (e.g. average between $-\Delta$ and $+\Delta$ or more generally $\Delta 1$ and $\Delta 2$). That is, wherever a term based on H(f) appears, this is replaced with an equivalent averaged term averaged with respect to θ.

Figure 23:
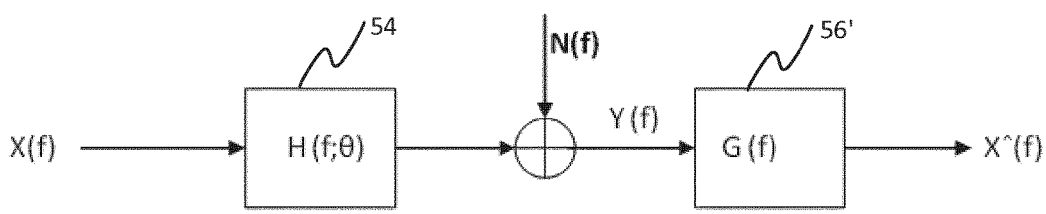
FIG. 23 is a schematic block diagram of a robust Wiener filter equalizing a filter H, FIG. 24 schematically illustrates repetitions of a message received over multiple frames, FIG. 25 schematically illustrates a comparison to determine a measure of similarity between different reconstructions of the same message, and FIG. 26 schematically illustrates a plot of the measure of similarly for a plurality of candidate symbol frequencies.

Starting from the classical formulation above, this gives:

$$G = \frac{E_\theta[H^*] \cdot S}{E_\theta[HH^*] \cdot S + \mathcal{N}_0}$$

where E is the average with respect to θ. See also FIG. 23.

A derivation of this is now explained in further detail. It is desired to find a fixed linear filter G that provides a linear minimum mean square error estimate $$\hat{X}(f) = G(f)Y(f)$$

such that $$e(f) = E_{x,N,\theta}[(X(f) - \hat{X}(f))^2]$$

is minimal.

Extending the classical derivation by taking also the ensemble average with respect to θ, one obtains:

$$e = E_{X,N,\theta}[|X - \hat{X}|^2]$$
$$= E_{X,N,\theta}[|X - G(HX + N)|^2]$$
$$= E_{X,N,\theta}[|(1 - GH)X - GN|^2]$$
$$= E_\theta[(1 - GH)(1 - GH)^*] \cdot E[|X|^2] + GG^* \cdot E[|N|^2],$$
(since X, N and θ are independent and $E[X] = E[N] = 0$)
$$= E_\theta[(1 - GH)(1 - GH)^*] \cdot S + GG^* \cdot \mathcal{N}_0$$
$$= \{1 - G \cdot E_\theta[H] - G^* \cdot E_\theta[H^*] + GG^* \cdot E_\theta[HH^*]\} \cdot S + GG^* \cdot \mathcal{N}_0$$

The best G(f) is found by differentiating e to G and setting the result to 0:

$$\frac{\partial}{\partial G} e = \{-E_\theta[H] + G^* \cdot E_\theta[HH^*]\} \cdot S + G^* \cdot \mathcal{N}_0 = 0$$

from which one obtains:

$$G = \frac{E_\theta[H^*] \cdot S}{E_\theta[HH^*] \cdot S + \mathcal{N}_0}$$

In a similar manner, one can incorporate a target response of a matched filter (MF):

$$G = \frac{H_{MF} \cdot E_\theta[H^*] \cdot S}{E_\theta[HH^*] \cdot S + \mathcal{N}_0}$$

To apply this there remains the computation of $E_\theta[H^*]$ and $E_\theta[HH^*]$. Some examples are given below.

A first approach is to use a Taylor series expansion of H and moments of θ. In the coded light rolling shutter application θ=Texp.

$$E[\theta] = \hat{\theta}$$
$$E[(\theta - \hat{\theta})^2] = \sigma_\theta^2$$
$$H'(f; \hat{\theta}) = \frac{\partial}{\partial \theta} H(f, \theta) \Big|_{\theta = \hat{\theta}}$$
$$H''(f; \hat{\theta}) = \frac{\partial^2}{(\partial \theta)^2} H(f, \theta) \Big|_{\theta = \hat{\theta}}$$

A Taylor series expansion gives:

$$H(f; \theta) = H(f; \hat{\theta}) + (\theta - \hat{\theta})H'(f; \hat{\theta}) + (\theta - \hat{\theta})^2 \frac{H''(f; \hat{\theta})}{2} + O(\theta - \hat{\theta})^3$$

$$E_\theta[H(f; \theta)] = H(f; \hat{\theta}) + H'(f; \hat{\theta}) E_\theta[\theta - \hat{\theta}] + \frac{H''(f; \hat{\theta})}{2} E_\theta[(\theta - \hat{\theta})^2] + O(\theta - \hat{\theta})^3$$
$$= H(f; \hat{\theta}) + \frac{H''(f; \hat{\theta})}{2} \sigma_\theta^2 + O(\theta - \hat{\theta})^3$$

$$E_\theta[H(f; \theta)H^*(f; \theta)] = H(f; \hat{\theta})H^*(f; \hat{\theta}) +$$
$$(H'(f; \hat{\theta})H'^*(f; \hat{\theta}) + \text{Re}\{H(f; \hat{\theta})H''^*(f; \hat{\theta})\}) \cdot \sigma_\theta^2 + O(\theta - \hat{\theta})^3$$

In the rolling shutter application:

$$H(f; \theta) = \frac{\sin(\pi \theta f)}{\pi \theta f}$$

Then:

$$\frac{\partial}{\partial \theta} H(f; \theta) = \frac{1}{\theta} \left\{ \cos(\pi \theta f) - \frac{\sin(\pi \theta f)}{\pi \theta f} \right\}$$

$$\frac{\partial^2}{(\partial \theta)^2} H(f; \theta) = \frac{2}{\theta^2} \left\{ \frac{\sin(\pi \theta f)}{\pi \theta f} - \cos(\pi \theta f) \right\} - \frac{\pi f}{\theta} \sin(\pi \theta f)$$

This approach works better for low frequencies since H" (f,θ) blows up with increasing frequency.

A second approach is to use a more exact computation assuming a known distribution of θ. Example: θ is uniform distributed between $\hat{\theta} - \Delta$ and $\hat{\theta} + \Delta$, and $$H(f; \theta) = \frac{\sin(\pi \theta f)}{\pi \theta f}.$$

Then:

$$E_\theta[H(f;\theta)] = \int_{\hat{\theta}-\Delta}^{\hat{\theta}+\Delta} \frac{\sin(\pi f \theta)}{\pi f \theta} d\theta$$

$$\approx \frac{-1}{\hat{\theta}} \frac{1}{(\pi f)^2} \{\cos \pi f(\hat{\theta}+\Delta) - \cos \pi f(\hat{\theta}-\Delta)\} \frac{1}{2\Delta},$$

$$\Delta << \hat{\theta}.$$

$$E_\theta[H(f;\theta)H^*(f;\theta)] = \int_{\hat{\theta}-\Delta}^{\hat{\theta}+\Delta} \frac{\sin^2(\pi f \theta)}{(\pi f \theta)^2} d\theta$$

$$\approx \frac{1}{4\Delta(\pi f \hat{\theta})^2} \cdot \left\{2\Delta - \frac{\sin(2\pi f \theta)}{2\pi f}\right\}\Bigg|_{\hat{\theta}-\Delta}^{\hat{\theta}+\Delta},$$

$$\Delta << \hat{\theta}.$$

Although in embodiments the above has been described in terms of a certain modification to the classical Wiener frequency domain formulation, there may be other Wiener filter formulations (e.g. time domain or approximations of a Wiener filter, or formulations solved for a particular H) and the principle of replacing an assumed-to-be-known H or function of with an average H or function of H may also be applied in such formulations.

Note also the robust Wiener filter disclosed herein can be used to equalize other filters other than a box (rectangular) filter, and/or in other applications other than receiving coded light. Another example is a band pass filter having a center frequency $f_0$ which may not be exactly known. In this case the filter to be equalized is a function of frequency f and center frequency $f_0$, $H(f; f_0)$, and the robust Wiener filter is determined from an averaged representation of $H(f; f_0)$ averaged with respect to $f_0$. E.g.:

$$G = \frac{E_{f_0}[H^*] \cdot S}{E_{f_0}[HH^*] \cdot S + N_0}$$

Further, the idea of the robust Wiener filter can also be extended to a higher dimensional theta, i.e. more than one parameter may be allowed to be uncertain. In this case the representation of filter H to be equalized (e.g. $H^*$ and $HH^*$) is averaged over each of the unknown quantities. For example, the parameters may be the center frequency and/or band width of a band pass filter.

Further, the noise term No could alternatively or additionally represent the spectral density of an interfering signal. A generic term for noise and/or interference is "disturbance".

More generally, it will be appreciated that the above embodiments have been described only by way of example. For instance the applicability of the present disclosure is not limited to any particular filtering, any particular stitching algorithm, and particular message or transmission format, nor any particular modulation scheme. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A signal processing module for receiving a coded light signal from light captured by a rolling-shutter camera, wherein the coded light signal comprises a periodically repeating message repeating with a message period; and wherein the signal processing module is configured to receive the coded light signal by performing operations of:
   receiving a respective portion of the message in each of a plurality of frames captured by the rolling-shutter camera, with different ones of said portions being received in different ones of the frames;
   based on each respective one of a discrete group of trial values of the message period, using the respective trial value to reconstruct a respective first version of the message from the portions received in a first subset of said frames, and to reconstruct a respective second version of the message from the portions received in a second subset of said frames, wherein one or more of the frames in the second subset are not members of the first subset;
   for each of the trial values, generating a respective value of a measure of similarity between the respective reconstructed first and second versions of the message; and
   determining an estimate of the message period based on the values of said measure of similarity, and determining an output version of the message based on said estimate.

2. The signal processing module of claim 1, configured to perform said determination of the estimate of the message period by:
   fitting a curve to the values of said measure of similarity generated for each of the trial values of the message period, determining a maximum of the curve, and determining said estimate as a value of the message period corresponding to a maximum of said curve.

3. The signal processing module of claim 2, wherein the fitted curve is a parabolic curve.

4. The signal processing module of claim 1, configured to perform the determination of said estimate of the message period by:
   selecting as said estimate one of the trial values of the message period for which the respective value of said measure of similarity is highest from amongst those generated.

5. The signal processing module of claim 1, wherein said measure of similarity is a measure of correlation between the respective reconstructed first and second versions of the message.

6. The signal processing module of claim 1, wherein said measure of similarly is a dot product of the respective reconstructed first and second versions of the message.

7. The signal processing module of claim 1, wherein the second subset of frames comprises one or more frames that are not members of the first subset but also comprises one or more frames that are members of the first subset.

8. The signal processing module of claim 1, wherein the second subset of frames contains no members of the first subset.

9. The signal processing module of claim 1, wherein the signal processing module is configured to perform said determining of the output version of the message by:

using the estimate of the message period to newly reconstruct the output version of the message from the portions received in the first subset of frames, or in the second subset of frames, or in a further subset of said frames.

10. The signal processing module of claim 1, wherein the signal processing module is configured to perform said determining of the output version by:

selecting as the output version one of the already-reconstructed first or second versions of the message, from amongst the first and second versions reconstructed for each of the trial values, for which the respective value of said measure of similarity is highest from amongst those generated.

11. The signal processing module of claim 1, wherein a light source emitting the coded light signal appears in only a subarea of each of the frames, the signal processing module being configured to detect said subarea and to extract the respective portion of the message from the subarea in each frame.

12. A device comprising the signal processing module of claim 1, and the rolling-shutter camera, wherein the signal-processing module is coupled to the rolling-shutter-camera so as to receive the captured frames.

13. A system comprising the device of claim 12, and a light source emitting light comprising said coded light signal, wherein the rolling-shutter camera is arranged to capture the light in said frames.

14. A computer-readable, non-transitory medium having stored therein instructions for receiving a coded light signal from light captured by a rolling-shutter camera, wherein the coded light signal comprises a periodically repeating message repeating with a message period; and being configured so as when run on a signal processing module to perform operations of:

receiving a respective portion of the message in each of a plurality of frames captured by the rolling-shutter camera, with different ones of said portions being received in different ones of the frames;

based on each respective one of a discrete group of trial values of the message period, using the respective trial value to reconstruct a respective first version of the message from the portions received in a first subset of said frames, and to reconstruct a respective second version of the message from the portions received in a second subset of said frames, wherein one or more of the frames in the second subset are not members of the first subset;

for each of the trial values, generating a respective value of a measure of similarity between the respective reconstructed first and second versions of the message; and determining an estimate of the message period based on the values of said measure of similarity, and determining an output version of the message based on said estimate.

15. A method of receiving a coded light signal from light captured by a rolling-shutter camera, wherein the coded light signal comprises a periodically repeating message repeating with a message period; and wherein the method comprises:

receiving a respective portion of the message in each of a plurality of frames captured by the rolling-shutter camera, with different ones of said portions being received in different ones of the frames;

based on each respective one of a discrete group of trial values of the message period, using the respective trial value to reconstruct a respective first version of the message from the portions received in a first subset of said frames, and to reconstruct a respective second version of the message from the portions received in a second subset of said frames, wherein one or more of the frames in the second subset are not members of the first subset;

for each of the trial values, generating a respective value of a measure of similarity between the respective reconstructed first and second versions of the message; and determining an estimate of the message period based on the values of said measure of similarity, and determining an output version of the message based on said estimate.

* * * * *